(12) United States Patent
Shattil

(10) Patent No.: US 10,756,790 B2
(45) Date of Patent: Aug. 25, 2020

(54) DISTRIBUTED RADIO SYSTEM

(71) Applicant: Genghiscomm Holdings, LLC, Boulder, CO (US)

(72) Inventor: Steve Shattil, Cheyenne, WY (US)

(73) Assignee: Genghiscomm Holdings, LLC, Boulder, CO (US)

(*) Notice: Subject to any disclaimer, the term of this patent is extended or adjusted under 35 U.S.C. 154(b) by 0 days.

(21) Appl. No.: 16/442,493

(22) Filed: Jun. 15, 2019

(65) Prior Publication Data

US 2019/0386717 A1    Dec. 19, 2019

Related U.S. Application Data

(60) Provisional application No. 62/686,083, filed on Jun. 17, 2018.

(51) Int. Cl.
| | | |
|---|---|---|
| *H04B 7/0456* | (2017.01) | |
| *H04B 7/024* | (2017.01) | |
| *H04L 27/26* | (2006.01) | |
| *G06N 20/00* | (2019.01) | |

(52) U.S. Cl.
CPC ........... *H04B 7/0456* (2013.01); *G06N 20/00* (2019.01); *H04B 7/024* (2013.01); *H04L 27/2614* (2013.01)

(58) Field of Classification Search
CPC combination set(s) only.
See application file for complete search history.

(56) References Cited

U.S. PATENT DOCUMENTS

| | | | |
|---|---|---|---|
| 5,500,856 A * | 3/1996 | Nagase | H04B 1/707 370/441 |
| 5,955,992 A | 9/1999 | Shattil | |
| 6,686,879 B2 | 2/2004 | Shattil | |
| 7,010,048 B1 | 3/2006 | Shattil | |
| 7,076,168 B1 | 7/2006 | Shattil | |
| 7,286,604 B2 | 10/2007 | Shattil | |
| 7,317,750 B2 | 1/2008 | Shattil | |
| 7,391,804 B2 | 6/2008 | Shattil | |
| 7,406,261 B2 | 7/2008 | Shattil | |
| 7,418,043 B2 | 8/2008 | Shattil | |
| 7,430,257 B1 | 9/2008 | Shattil | |
| 7,787,514 B2 | 8/2010 | Shattil | |
| 7,787,556 B2 * | 8/2010 | Zhang | H04B 7/0854 375/267 |
| 8,077,805 B1 * | 12/2011 | Sarrigeorgidis | H04L 25/022 375/316 |

(Continued)

OTHER PUBLICATIONS

H. Prakash, C.D.Suriyakala; "PAPR Reduction in MIMO SC-FDMA—ASurvey"; Int. J Rec. Adv. Sci. Teck, 2015; 2(2)11-19.

(Continued)

*Primary Examiner* — Linda Wong
(74) *Attorney, Agent, or Firm* — Steven J Shattil

(57) ABSTRACT

Systems, methods, and apparatuses for synthesizing a wireless communication signal are provided. A base expanded matrix is generated, wherein a sum of values in each row of the base expanded matrix produces a base signal vector. Values in at least one column of the base expanded matrix are updated to produce an updated expanded matrix. The values in each row of the updated expanded matrix are summed to produce an updated signal vector. The updated signal vector is transmitted over a wireless channel.

24 Claims, 11 Drawing Sheets

(56) References Cited

U.S. PATENT DOCUMENTS

| | | | |
|---|---|---|---|
| 8,401,095 B2* | 3/2013 | Han | H04L 27/2636 375/259 |
| 8,670,390 B2 | 3/2014 | Shattil | |
| 8,885,628 B2 | 10/2014 | Palanki et al. | |
| 8,929,550 B2 | 1/2015 | Shattil | |
| 8,942,082 B2 | 1/2015 | Shattil | |
| 9,225,471 B2 | 12/2015 | Shattil | |
| 9,432,079 B1* | 8/2016 | Kumar | H04B 1/713 |
| 9,485,063 B2 | 11/2016 | Shattil | |
| 9,628,231 B2 | 4/2017 | Shattil | |
| 9,693,339 B2 | 6/2017 | Palanki et al. | |
| 9,698,888 B2* | 7/2017 | Ko | H04L 1/0026 |
| 9,798,329 B2 | 10/2017 | Shattil | |
| 9,870,341 B2* | 1/2018 | Badin | G06F 17/16 |
| 2004/0086027 A1* | 5/2004 | Shattil | H04L 27/2621 375/146 |
| 2004/0178954 A1* | 9/2004 | Vook | H04L 25/03343 342/383 |
| 2005/0265293 A1 | 12/2005 | Ro et al. | |
| 2006/0034378 A1 | 2/2006 | Lindskog et al. | |
| 2006/0245346 A1 | 11/2006 | Bar-Ness et al. | |
| 2006/0262870 A1 | 11/2006 | Khan | |
| 2007/0183386 A1 | 8/2007 | Muharemovic et al. | |
| 2007/0206686 A1* | 9/2007 | Vook | H04B 7/0671 375/260 |
| 2007/0211807 A1 | 9/2007 | Han et al. | |
| 2008/0075188 A1* | 3/2008 | Kowalski | H04L 27/261 375/267 |
| 2008/0095121 A1 | 4/2008 | Shattil | |
| 2008/0298335 A1* | 12/2008 | Lee | H04J 11/005 370/342 |
| 2008/0317172 A1* | 12/2008 | Zhang | H04B 7/0854 375/340 |
| 2009/0112551 A1* | 4/2009 | Hollis | G06F 30/367 703/14 |
| 2009/0147870 A1 | 6/2009 | Lin et al. | |
| 2009/0274103 A1 | 11/2009 | Yang et al. | |
| 2009/0304108 A1 | 12/2009 | Kwon et al. | |
| 2010/0110875 A1 | 5/2010 | No et al. | |
| 2010/0165829 A1 | 7/2010 | Narasimha et al. | |
| 2011/0064156 A1* | 3/2011 | Kim | H04B 7/0639 375/267 |
| 2011/0096658 A1* | 4/2011 | Yang | H04L 27/2615 370/210 |
| 2011/0105051 A1* | 5/2011 | Thomas | H04B 7/0617 455/69 |
| 2011/0206207 A1 | 8/2011 | Priotti | |
| 2011/0281534 A1 | 11/2011 | Liao et al. | |
| 2012/0093200 A1* | 4/2012 | Kyeong | H04B 7/0851 375/144 |
| 2012/0177140 A1* | 7/2012 | Sahara | H04B 7/0456 375/267 |
| 2012/0224517 A1 | 9/2012 | Yun et al. | |
| 2012/0294346 A1 | 11/2012 | Kolze | |
| 2013/0198590 A1* | 8/2013 | Kim | H04L 1/0068 714/776 |
| 2013/0223269 A1* | 8/2013 | To | H04L 25/03942 370/252 |
| 2014/0198863 A1 | 7/2014 | Terry | |
| 2015/0103723 A1 | 4/2015 | Kim et al. | |
| 2015/0124765 A1* | 5/2015 | Rong | H04W 72/0473 370/329 |
| 2015/0195840 A1 | 7/2015 | Ahn et al. | |
| 2015/0199963 A1* | 7/2015 | Maaninen | G10L 15/16 704/232 |
| 2015/0227747 A1* | 8/2015 | Gassi | G06F 16/122 713/193 |
| 2015/0271000 A1 | 9/2015 | Yang et al. | |
| 2015/0304153 A1 | 10/2015 | Moffatt et al. | |
| 2015/0358190 A1 | 12/2015 | Kruglick et al. | |
| 2016/0050096 A1 | 2/2016 | DelMarco | |
| 2016/0050099 A1 | 2/2016 | Siohan et al. | |
| 2016/0197756 A1 | 7/2016 | Mestdagh et al. | |
| 2016/0248443 A1* | 8/2016 | Murakami | H03M 13/235 |
| 2016/0254889 A1 | 9/2016 | Shattil | |
| 2016/0269083 A1 | 9/2016 | Porat et al. | |
| 2016/0344497 A1 | 11/2016 | Myung et al. | |
| 2016/0353446 A1 | 12/2016 | Abdoli et al. | |
| 2017/0019284 A1 | 1/2017 | Ankarali et al. | |
| 2017/0126291 A1* | 5/2017 | Lea | H01Q 21/50 |
| 2017/0126454 A1* | 5/2017 | Huan | H04L 27/2614 |
| 2017/0134202 A1 | 5/2017 | Baligh et al. | |
| 2017/0134235 A1 | 5/2017 | Wu et al. | |
| 2017/0250848 A1 | 8/2017 | Lee et al. | |
| 2017/0255593 A9* | 9/2017 | Agee | G06F 17/16 |
| 2017/0264474 A1 | 9/2017 | He et al. | |
| 2017/0279648 A1 | 9/2017 | Song et al. | |
| 2017/0353340 A1 | 12/2017 | Raphaeli et al. | |
| 2018/0006692 A1* | 1/2018 | Noh | H04L 25/03929 |
| 2018/0062904 A1 | 3/2018 | Hwang et al. | |
| 2018/0075482 A1* | 3/2018 | Gierach | G06Q 30/0254 |
| 2018/0091338 A1 | 3/2018 | Mayer et al. | |
| 2018/0109408 A1 | 4/2018 | Sandell et al. | |
| 2018/0167244 A1 | 6/2018 | Cheng et al. | |
| 2018/0191543 A1 | 7/2018 | Park et al. | |
| 2018/0212810 A1 | 7/2018 | Park et al. | |
| 2018/0219590 A1* | 8/2018 | Matsuda | H04B 7/0456 |
| 2018/0262253 A1* | 9/2018 | Rahman | H04B 7/0478 |
| 2018/0278303 A1* | 9/2018 | Hong | H04L 5/0037 |
| 2018/0309599 A1* | 10/2018 | Lee | H04L 25/0218 |
| 2018/0350351 A1* | 12/2018 | Kopys | G10L 15/02 |
| 2019/0181928 A1* | 6/2019 | Pan | H04L 27/36 |
| 2019/0393948 A1* | 12/2019 | Zhao | H04B 7/0619 |

OTHER PUBLICATIONS

E Hajlaoui, M. Abdellaoui; "SOCP Approach for Reducing Papr for MIMO-OFDM Via Tone Reservation"; International Journal of Distributed and Parallel Systems (IJDPS) vol. 2, No. 3, May 2011.

J. Shin, B. Seo; "PAPR Reduction Scheme for MISO and MIMO OFDM Systems with Limited Feedback"; WSEAS Transactions on Communications 13:355-362—Jan. 2014.

D. Sinanovic, et al.; "Low PAPR Spatial Modulation for SC-FDMA"; IEEE Transactions on Vehicular Technology; vol. 66, Issue: 1, Jan. 2017.

G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.

M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.

M. Vu, A. Paulraj; "MIMO Wireless Linear Precoding"; IEEE Signal Processing Magazine. Submitted Feb. 2006, revised Nov. 2006 and Dec. 2006.

H.G. Myung, et al.; "Peak Power Characteristics of Single Carrier FDMA MIMO Precoding System"; 2007 IEEE 66th Vehicular Technology Conference, Sep. 30-Oct. 3, 2007.

B. Naik, et al.; "Reduction of PAPR in MIMO-OFDM/A System Using Polyphase Complementary Modulation"; International Journal of Innovative Research in Computer and Communication Engineering; vol. 2, Issue 5, May 2014.

A.S. Parihar, A. Rai; "A Review: PAPR Reduction Techniques in MIMO OFDM System"; International Journal of Engineering and Innovative Technology (IJEIT); vol. 4, Issue 12, Jun. 2015.

B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).

C.A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.

K Mhatre, U.P. Khot; "Efficient Selective Mapping PAPR Reduction Technique"; International Conference on Advanced Computing Technologies and Applications (ICACTA-2015); Procedia Computer Science 45 ( 2015 ) 620-627.

(56) References Cited

OTHER PUBLICATIONS

K. Srinivasarao, et al.; "Peak-To-Average Power Reduction in MIMO-OFDM Systems Using Sub-Optimal Algorithm"; International Journal of Distributed and Parallel Systems (IJDPS) vol. 3, No. 3, May 2012.
K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.
H. Zhang, D.L. Goeckel; "Peak Power Reduction in Closed-Loop MIMO-OFDM Systems via Mode Reservation"; IEEE Communications Letters, vol. 11, No. 7, Jul. 2007.
C. L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.
P. Sindhu, G. Krishnareddy; "Peak and Average Power Reduction in OFDM System with Trellis Shaping Method"; International Journal of Advanced Research in Electrical, Electronics and Instrumentation Engineering; vol. 6, Issue 7, Jul. 2017.
H-B Jeon, et al.; "Bit-Based SLM Schemes for PAPR Reduction in QAM Modulated OFDM Signals"; IEEE Transactions on Broadcasting, vol. 55, No. 3, Sep. 2009.
H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.
S-J Heo, et al.; "A Modified SLM Scheme With Low Complexity for PAPR Reduction of OFDM Systems"; IEEE Transactions on Broadcasting, vol. 53, No. 4, Dec. 2007.
M. I. Abdullah, et al.; "Comparative Study of PAPR Reduction Techniques in OFDM"; ARPN Journal of Systems and Software; vol. 1, No. 8, Nov. 2011.
E. Abdullah, et al.; "Modified selective mapping scheme with low complexity for minimizing high peakaverage power ratio in orthogonal frequency division multiplexing system"; AIP Conference Proceedings 1774, 050005 (2016).
S.T. O'Hara, J.R. Periard; "Orthogonal-Coded Selective Mapping (OCSM) for OFDM PEAKTO-Average Power Reduction Without Side Information"; Proceeding of the SDR 04 Technical Conference and Product Exposition 2004, Syracuse, NY, Technology Center— Syracuse Research Corporation. 2004.
P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.
D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.
B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.
C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.
C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.
B. Natarajan, C.R. Nassar, S. Shattil, M. Michelini, and Z. Wu; "High-Performance MC-CDMA Via Carrier Interferometry Codes," Vehicular Technology, IEEE Transactions on; vol. 50, Issue 6, Nov. 2001, pp. 1344-1353.
Z. Wu, B. Natarajan, C.R. Nassar, S. Shattil; "High-performance, high-capacity MC-CDMA via carrier interferometry," pp. G-11-G-16.
S.A. Zekavat, C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.
B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.
Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.
B. Natarajan, C.R. Nassar, S. Shattil; "Innovative pulse shaping for high-performance wireless TDMA," Communications Letters, IEEE vol. 5, Issue 9, Sep. 2001 pp. 372-374.
B.Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp.1799-1803.
LTE: Evolved Universal Terrestrial Radio Access (E-UTRA); Multiplexing and channel coding (3GPP TS 36.212 version 8.8.0 Release 8), Jan. 2010.
LTE: Evolved Universal Terrestrial Radio Access (E-UTRA); Physical channels and modulation (3GPP TS 36.211 version 8.7.0 Release 8), Jun. 2009.
MD Ortigueira, M-A Lagunas; "Eigendecomposition versus singular value decomposition in adaptive array signal processing"; Signal Processing 25 (1991) pp. 35-49.
P. Comon ; G.H. Golub; "Tracking a few extreme singular values and vectors in signal processing"; Proceedings of the IEEE (vol. 78, Issue: 8, Aug 1990), pp. 1327-1343.
B.N. Parlett; The Symmetric Eigenvalue Problems. Englewood Cliffs, NJ: Prentice-Hall, 1980.
Z.Ye, et al.; "A Novel Technique for the Blind Estimation of a Channel Matrix"; 1998 IEEE International Conference on Electronics, Circuits and Systems. Surfing the Waves of Science and Technology (Cat. No. 98EX196); Sep. 7-10, 1998.
G. Ricci, et al.; "Blind Multiuser Detection via Interference Identification"; IEEE Transactions on Communications, vol. 50, No. 7, Jul. 2002.
R. Schreiber; "Implementation of Adaptive Array Algorithms"; IEEE Transactions on Acoustics, Speech, and Signal Processing, vol. ASSP-34, No. 5, Oct. 1986.
P.I. Davies, M.I. Smith; "Updating the singular value decomposition"; Journal of Computational and Applied Mathematics 170 (2004), pp. 145-167.
G. Mathew, V.U. Reddy; "Adaptive Estimation of Eigensubspace"; IEEE Transactions on Signal Processing, vol. 43. No. 2, Feb. 1995.
M. Moonen, et al.; "A note on 'Efficient numerically stabilized rank-one eigenstructure updating' (and reply)"; IEEE Transactions on Signal Processing (vol. 39 , Issue: 8 , Aug. 1991), pp. 1911-1914.
K-B Yu; "Recursive updating the eigenvalue decomposition of a covariance matrix"; IEEE Transactions on Signal Processing (vol. 39 , Issue: 5 , May 1991), pp. 1136-1145.

* cited by examiner

DISTRIBUTED RADIO SYSTEM

CROSS REFERENCE TO PRIOR APPLICATIONS

This application claims the priority benefit of U.S. Patent Application Ser. No. 62/686,083, filed on Jun. 17, 2018, which is hereby incorporated by reference in its entirety.

BACKGROUND

Aspects of this disclosure relate generally to communication networks, and more particularly, to computationally efficient signal synthesis and signal analysis.

Wireless communication systems (e.g. wireless networks) provide various telecommunication services, such as telephony, video, data, messaging, and broadcasts. Wireless communication systems may employ multiple-access technologies capable of supporting communication with multiple users by sharing available system resources (e.g., time, frequency, power). Examples of such multiple-access technologies include code division multiple access (CDMA), time division multiple access (TDMA), frequency division multiple access (FDMA), orthogonal frequency division multiple access (OFDMA), single-carrier frequency divisional multiple access (SC-FDMA), and discrete Fourier transform spread orthogonal division multiplexing (DFT-s-OFDM). It should be understood that SC-FDM and DFT-s-OFDM are two names of essentially similar technologies, known as Carrier Interferometry (CI). However, DFT-s-OFDM is the terminology used in 3GPP specifications.

These multiple access technologies have been adopted in various telecommunication and wireless network standards. For example, fifth generation (5G) (also called New Radio (NR)) wireless access is being developed with three broad use case families in mind: enhanced mobile broadband (eMBB), massive machine-type communications (mMTC) and ultra-reliable low-latency communications (URLLC). Beyond 5G refers to visions for future generations of wireless communications (e.g., 5G-Advanced, 5G-Extreme, 6G) that enable groundbreaking high-bandwidth, low-latency, massive capacity, and massive connectivity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

To realize 5G and Beyond-5G, new networking technologies are being developed, beginning with Massive multiple-input multiple output (MIMO), Cooperative MIMO, millimeter wave communications, non-orthogonal multiple access (NOMA), and device-to-device (D2D) via proximity services (ProSe). 5G will likely evolve to include mobile and airborne relays. Many infrastructure functions can be pushed to the network's edge to reduce latency, extend coverage, enhance versatility, and exploit the computational resources of the vast number of user devices. New paradigms, such as software-defined networking and fog computing are emerging. Artificial Intelligence (AI), such as deep learning neural networks, can be developed for many network functions, and with access to the vast cloud and fog resources, spawn new industries. Cooperative AI can be developed for situational awareness, security, threat mitigation, navigation, financial services, environmental monitoring.

Network devices commonly perform linear algebra computations. Matrix products are a central operation in computational applications of linear algebra. Their computational complexity is $O(n^3)$ (for n×n matrices) for the basic algorithm. The complexity is $O(n^{2.373})$ for the asymptotically fastest algorithm. This nonlinear complexity means that the matrix product is often the critical part of many algorithms. Techniques that enable a processor in a network device to more efficiently compute the matrix product can be useful in one or more of the networks, applications, and use case families mentioned in this disclosure, as reduced latency, improved power efficiency, improved computational efficiency, and/or combinations thereof may be desired.

Aspects of the disclosure can be configured to operate with any of the multiple-access technologies, networking technologies, use case families, and telecommunication and wireless network standards mentioned herein. AI techniques can be integrated with disclosed aspects, such as with signal coding/decoding in a modem of a network device. Disclosed aspects can be implemented in a mobile ad hoc network (MANET), peer-to-peer network, vehicular ad hoc network (VANET), smart phone ad hoc network (SPAN), Cloud-relay network, flying ad hoc network (FANET), distributed antenna system (DAS), wireless sensor network (WSN), wireless personal area network (WPAN), wireless heterogeneous network (HetNet), Internet area network (IAN), near-me area network (NAN), or any combinations thereof.

A network device can include one or more base stations, one or more user equipment devices (UEs), one or more relay stations, and/or access terminals of various types. A network device may comprise a virtual machine, a virtual antenna array, a distributed software-defined radio, a virtual radio transceiver, a fog, a Cloud, or combinations thereof.

In some examples, a base station may include or be referred to by those skilled in the art as a base transceiver station, a radio has station, an access point, an access node, a radio transceiver, a NodeB, an eNodeB (eNB), a gNodeB (gNB), a Home NodeB, a Home eNodeB, a Home gNodeB, a relay, or some other suitable terminology. A UE may include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a modem, or some other suitable terminology, A UE may include or be referred to as an Internet-of-Thing (IoT) device, an Internet of Vehicles (IoV) device, a Machine-to-Machine (M2M) device, or a sensor or a data aggregation point (DAP) in a wireless sensor network.

In an aspect of the disclosure, a method of wireless communication may include synthesizing a communication signal and transmitting the communication signal over a wireless channel. The synthesizing can comprise generating a base expanded matrix having a plurality of rows and a plurality of columns, wherein a sum of values in each row produces a base signal vector; updating values in at least one column of the base expanded matrix to produce an updated expanded matrix; and summing values in each row of the updated expanded matrix to produce an updated signal vector. The updated signal vector may be the communication signal that is transmitted over the wireless channel in a wireless communications network. The method of wireless communication may be performed in combination with any aspects disclosed herein.

In an aspect of the disclosure, a network device comprises a memory and at least one processor in communication with the memory. The at least one processor may be configured to perform the method of wireless communication above. The at least one processor may be configured to perform the method of wireless communication above in combination with any aspects disclosed herein.

In an aspect of the disclosure, a computer-readable medium storing computer code executable by a processor for causing a computer to implement the method of wireless communication above. The code may be configured to perform the method of wireless communication above in combination with any aspects disclosed herein. The computer-readable medium and the code may be referred to as a computer program product.

In an aspect of the disclosure, a network device (e.g., a wireless communication device) may include means for synthesizing a communication signal and means for transmitting the communication signal over a wireless channel. The means for synthesizing may comprise means for generating a base expanded matrix having a plurality of rows and a plurality of columns, wherein a sum of values in each row produces a base signal vector; means for updating values in at least one column of the base expanded matrix to produce an updated expanded matrix; and means for summing values in each row of the updated expanded matrix to produce an updated signal vector. The updated signal vector may be the communication signal that is transmitted over the wireless channel. The wireless communication device may be further configured to perform any of the aspects disclosed herein.

By way of example, but without limitation, means for generating an expanded matrix can comprise a physical data storage medium, such as (but not limited to) random access memory, hard drive, virtual memory, and the like; and can comprise a data buffer, for example, and a data-processor for organizing and/or manipulating data in the data buffer and optionally provide for managing I/O operations. The means for generating the expanded matrix can provide a data output format and/or memory-access scheme designed to enable or facilitate the computational processing disclosed herein. While summing the elements in each row of the base expanded matrix can produce a base signal vector, the summing describes a characteristic feature of the base expanded matrix, and is therefore not a required step in generating the base expanded matrix.

By way of example, but without limitation, means for updating can comprise circuits, processors, or computer program code (stored in memory as software and/or firmware) in combination with a general-purpose processor configured to perform multiplicative and/or arithmetic update operations on the data values of the expanded matrix. In some aspects, updating can be configured to perform bit operations on the data. Update operations may provide for shifting, swapping, or otherwise rearranging data values in memory.

Aspects disclosed herein can comprise data-independent updating schedules, data-dependent updating schedules, and combinations thereof. In some aspects, the parameters to be updated in a data-independent updating schedule are chosen at random. Aspects may employ a stochastic partial update algorithm. In one example, parameters to be updated are partitioned into multiple subsets of the total set of parameters, and then the subsets are randomly selected to be updated in each iteration. In some aspects, a predetermined schedule of parameters to be updated in each iteration is provided.

Update algorithms disclosed herein can be configured to reduce the number of computations needed to generate a transmission signal (such as a signal having one or more desired properties), or to process a received signal. The update algorithms can take into account costs for program and data memory. For example, the reduction in number of execution cycles might be offset by the additional cycles needed for storing data in intermediate steps. Thus, a processing metric to be optimized by the algorithm can comprise any combination of these costs.

A step size used for updating may be determined to provide desirable conditions, such as convergence conditions and/or stability. The step size may be constant or it may be variable based on one or more measurement criteria. In some aspects, conditions on the step size parameter are derived that provide convergence in the mean and the mean square sense.

By way of example, but without limitation, means for summing can include program code that configures a processor to read data from memory such that the read data is grouped into blocks corresponding to the matrix rows, and then the data values in each row are summed. Various computer circuitry and/or logic may be configured with an I/O controller to effect such arithmetic operations. A CPU's accumulator (e.g., general purpose registers that function as an accumulator) may be employed for such arithmetic operations, and the results can be written to memory to produce the updated vector(s).

In some aspects, updating comprises an operation developed from a data-symbol matrix and a weight matrix that commute under multiplication, thereby removing the data-symbol matrix and its inverse from the operation. For example, data-symbol values and weight values may be configured functionally to comprise matrix structures that commute at least with each other under multiplication. These matrix structures can be employed as operators and/or operands. In some aspects, the data-symbol matrix commutes with the inverse of the weight matrix. In some aspects, the weight matrix commutes with the inverse of the data-symbol matrix. In some aspects, the inverse of a base weight matrix (which can be an initial weight matrix or a previous update weight matrix) is removed by setting the base weight matrix to an Identity matrix. This can be done implicitly or explicitly. In an aspect, the initial weight matrix is set to the Identity matrix. In an aspect, the current data-symbol matrix is set equal to a product of a previous weight matrix with a previous data-symbol matrix. In an aspect, a previous updated expanded matrix is designated as the current base expanded matrix.

In some aspects, a computing system learns and/or detects features in base and/or updated data, and/or provides updates based on an application of one or more machine learning algorithms or processes to expanded data.

In an aspect of the disclosure, means for generating, the means for updating, and the means for summing comprises a processor; and the network device further comprises a memory coupled to the processor. The processor may be configured to perform the method of wireless communication above in combination with any aspects disclosed herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

Figure 1A:
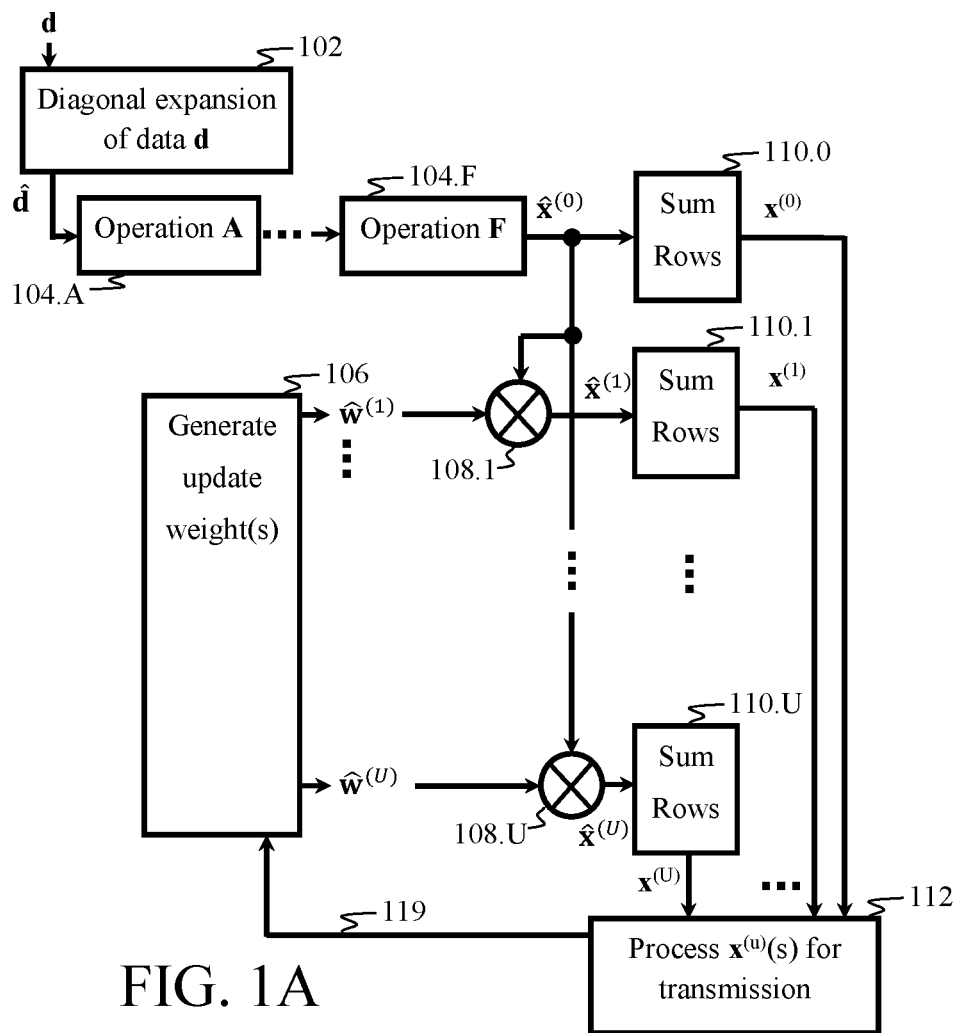
FIGS. 1A, and 2-8 are flow diagrams of example methods, functional components of an apparatus, and software modules according to aspects of the presents disclosure, which may be used to synthesize at least one signal that is transmitted over a wireless channel in a wireless network.

It is contemplated that elements described in one aspect may be beneficially utilized on other aspects without specific recitation.

DETAILED DESCRIPTION

The description that follows includes exemplary systems, methods, techniques, instruction sequences, and computer program products that embody techniques of this disclosure. However, it is understood that the described aspects may be practiced without these specific details. Apparatuses and methods are described in the following description and illustrated in the accompanying drawings by various blocks, modules, components, circuits, steps, processes, algorithms, etc. (collectively referred to as "elements"). These elements may be implemented using electronic hardware, computer software, firmware, or any combination thereof.

In accordance with some general aspects of the disclosure, a data sequence (denoted by a length-N vector $d=[d_0, \ldots, d_{N-1}]$) is processed in a network device to generate a discrete-time signal (denoted by vector x) of length-N or longer for transmission in a communication network:

$$x = FEDCBAd$$

where A, B, C, D, E, F denote any number of operations performed on d. The operations can comprise matrix multiplications, invertible transform operations, and/or other linear operations. The term "matrix" used herein can be understood to include tensors. The operations can comprise spreading, multiple-access encoding, transform precoding, resource unit mapping, layer mapping, selective mapping, filtering, pulse shaping, spatial (and/or frequency) precoding, invertible transforms (e.g., FFT, short-time Fourier transform, fractional Fourier transform, space-time Fourier transform, geometric Fourier transform, discrete cosine transform, Gabor transform, Laplace transform, Mellin transform, Borel transform, wavelet transform, Constant-Q transform, Newland transform, (fast) S transform, Z transform, Chirplet transform, Wigner transform, integral transform, linear canonical transform, and multi-dimensional transforms thereof), and/or others.

In one aspect, A may be a spreading matrix (e.g., one or more spreading code vectors), B may be a spread-DFT operator (such as an FFT), C may be a pulse-shaping filter, D may be a MIMO precoding matrix, E may be an OFDM subcarrier mapping, and F may be OFDM modulation (e.g., an IFFT). Two or more consecutive ones of the operations (e.g., A, B, C, D, E, F) may be combined into a single operator, thereby exploiting the associative property of matrix multiplication. The number of operations may be greater than or less than the number of operations depicted herein. Furthermore, d may comprise transform(s), matrix product(s), and/or encoded version of data.

Some aspects disclosed herein relate generally to calculating an update to x (the update to x being denoted as $x^{(u)}$, where update index u>0) that would result from an update operation performed on d (or on a product or transform involving d) by configuring a matrix expansion of an initial or previous vector x (which may be denoted as $x^{(0)}$ or $x^{(u-1)}$) and performing operations on the matrix expansion. This can avoid repeating the computations of one or more of the operations (e.g., A, B, C, D, E, F), thereby reducing computational complexity (e.g., the number of complex multiplications). Thus, the update can be performed independently of one or more of the operations (e.g., A, B, C, D, E, F). For example, an update operation on the matrix expansion of d can instead be performed on the matrix expansion of $x^{(0)}$ or $x^{(u-1)}$ without needing to account for how any of the operations (e.g., A, B, C, D, E, F) affect updates to the vector d.

In one example, an update performed on d can be represented as a Hadamard product of a length-N weight vector $w^{(u)}(=[w_0^{(u)}, \ldots, w_{N-1}^{(u)}])$ with d. A weight vector corresponding to the initial or previous d is expressed as $w^{(0)}$ (u=0). The Hadamard product (also known as the Schur product or the entrywise product) is a binary operation that takes two matrices of the same dimensions and produces another matrix of the same dimension as the operands, where each element i, j is the product of elements i, j of the original two matrices. For two matrices X and Y of the same dimension m×n, the Hadamard product X∘Y is a matrix of the same dimension as the operands, with elements given by $$(X \circ Y)_{i,j} = (X)_{i,j}(Y)_{i,j}$$

The Hadamard product is associative and distributive. Unlike the matrix product, the Hadamard product is commutative. Thus, in some aspects, matrix forms that commute, and operations thereon, can be configured to provide a result that is analogous to the Hadamard product of two vectors. For example, diagonal matrices or Toeplitz matrices may be employed. Disclosed aspects that exploit this and other features can provide advantageous solutions for synthesizing and/or analyzing signals employed in data communications. Such aspects can improve the functioning of a computer processor and related technological processes disclosed herein. Furthermore, data structures disclosed herein can improve the way a computer processor stores and retrieves data in memory for signal-processing applications in wireless communications. Some benefits of the disclosed aspects include faster processing time, improved flexibility for updating signal features, and improvements to how a computer stores and reads data from memory to perform signal processing. In some aspects, a network device comprises a modem having a signal-processing component that includes a signal coding/decoding scheme configured to generate and transmit, or alternatively, to receive a signal in accordance with the figures and description.

The present disclosure provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1A depicts some method and apparatus aspects of the disclosure. Input data symbols can be formatted (or otherwise implemented functionally) 102 to generate a diagonal expansion matrix $\hat{d}$. The data symbols may be processed for transmission in a wireless communication network. In accordance with some aspects, the data vector d can be implemented functionally as an N×N diagonal matrix $\hat{d}$ with diagonal elements set to the elements in d:

$$\hat{d} = \begin{vmatrix} d_0 & 0 & \cdots & 0 \\ 0 & d_1 & \cdots & 0 \\ \vdots & \vdots & \ddots & \vdots \\ 0 & 0 & \cdots & d_{N-1} \end{vmatrix}$$

This is referred to as a diagonal expansion matrix of d.

In weight generation 106, one or more (U) update weights are computed. The weight vectors can be implemented functionally as N×N diagonal matrix $\hat{w}^{(u)}$ with diagonal elements set to the elements in $w^{(u)}$:

$$\hat{w}^{(u)} = \begin{vmatrix} w_0^{(u)} & 0 & \cdots & 0 \\ 0 & w_1^{(u)} & \cdots & 0 \\ \vdots & \vdots & \ddots & \vdots \\ 0 & 0 & \cdots & w_{N-1}^{(u)} \end{vmatrix}$$

One or more operations, such as a plurality of operations A, . . . , F (104.A-104.F), can be performed on the diagonal expansion matrix (or equivalent representation) of d to produce an expanded matrix $\hat{x}^{(u)}$, which may be an expanded discrete-time matrix, for example. In some aspects, an initial weighting $w^{(0)}$ (not shown) may be performed explicitly on the data. In some aspects, the effects of any previous weighting is incorporated into the data values.

Operations A, . . . , F (104.A-104.F) can comprise vectors, matrices, and/or tensors, and can be implemented via transform operations, including fast transforms. In one aspect, operator A may normally comprise a Hadamard product of vector a with vector d, but is configured to operate with expanded matrices disclosed herein. For example, a can be converted to diagonal expansion matrix $\hat{a}$. Then matrix multiplication $\hat{a}\hat{d}$ produces an N×N diagonal matrix whose diagonal elements are the values of the Hadamard product a∘d. One or more subsequent operations (e.g., B, . . . , F) are then performed on the diagonal expansion matrix $\hat{a}\hat{d}$ to produce expanded discrete-time matrix $\hat{x}^{(u)}$, which can be an initial (index u=0) or updated (u>0) expanded discrete-time matrix.

The methods and apparatus aspects disclosed herein with respect to mathematical operations and matrix (any matrix, including vectors and tensors) structures can be implemented functionally so as to effect the disclosed operations and structures. Such implementations may not explicitly comprise such structures. For example, expanded matrices, diagonal matrices, and operations thereon may be effected via various data structures and algorithms in computer code, data storage schemes in memory, circuit designs, processor architectures, etc.

In some aspects, an operator (e.g., operation 104.F) can comprise an interpolating function, such as an interpolation filter. In some aspects, the operator can employ a Vandermonde matrix. An N×N (or larger: e.g., MN×MN) expanded updated discrete-time matrix $\hat{x}^{(u)}$ can be computed from $\hat{x}^{(u)}$=FEDcBA$w^{(u)}\hat{d}$. Operator F can be an MN-point transform (where M is an integer >1) configured to operate on an MN×MN matrix constructed, for example, by performing "zero stuffing" or "zero padding" of its input. In one example, each $n^{th}$ element of discrete-time signal vector $x^{(u)}$ can be generated by summing (e.g., row summations 110.0-110.U) the elements of the corresponding $n^{th}$ row in matrix $\hat{x}^{(u)}$, wherein the $n^{th}$ row is expressed as:

$$\hat{x}_n^{(u)} = \frac{1}{MN}[X_0, X_1 e^{i2\pi(1)n/MN}, \ldots, X_{MN-1} e^{i2\pi(MN-1)n/MN}].$$

Thus, each element in vector $\hat{x}_n^{(u)}$ is an addend of the $n^{th}$ value of the length-MN discrete-time vector $x^{(u)}$. In one aspect, operator F is an MN-point interpolation filter that operates on an MN×MN zero-stuffed operand matrix to produce an MN×MN expanded discrete-time matrix $\hat{x}^{(u)}$, and $\hat{x}_n^{(u)}$ is a length-MN vector.

An expression for F can be derived using computations of an initial or previous (e.g., u=0) candidate expanded discrete-time matrix $\hat{x}^{(0)}$:

$$F = \hat{x}^{(0)} \hat{d}^{-1} \hat{w}^{(0)} A^{-1} B^{-1} C^{-1} D^{-1} E^{-1}$$

where $(.)^{-1}$ denotes a complementary or inverse of operation (.), and which is also typically employed at a corresponding receiver. An updated $\hat{x}^{(u)}$ can be expressed using the above substitution for F:

$$\hat{x}^{(u)} = \hat{x}^{(0)} \hat{d}^{-1} \hat{w}^{(0)-1} A^{-1} B^{-1} C^{-1} D^{-1} E^{-1} EDCBA \hat{w}^{(u)} \hat{d}$$

where (u=0) denotes initial $\hat{x}^{(u)}$ and $\hat{w}^{(u)}$, and (u>0) denotes a $u^{th}$ update. The term $\hat{w}^{(0)}$ is an optional weight matrix (not explicitly shown in FIG. 1A, but could be implemented in or prior to operator A), which can be a diagonal expansion matrix that multiplies $\hat{d}$. In some aspects, $\hat{d}$ can be an operator that operates on an update weight matrix.

The operator terms ($E^{-1}E$ to $A^{-1}A$) drop out, and because the weight and data matrices are diagonal (and therefore commute under multiplication), the terms can be rearranged to remove the explicit operations involving $\hat{d}$ and $\hat{d}^{-1}$ in the update, resulting in updated expanded matrix, $\hat{x}^{(u)}$ expressed as:

$$\hat{x}^{(u)} = \hat{x}^{(0)} \hat{w}^{(0)-1} \hat{w}^{(u)}$$

The values of $\hat{w}^{(0)}$ may be selected so that its matrix inverse is easily computed. For example, values of ±1 are not changed by inversion. The expression is further simplified when $\hat{w}^{(0)}$ (and thus, $\hat{w}^{(0)-1}$) is an Identity matrix, which results in the multiplicative update:

$$\hat{x}^{(u)} = \hat{x}^{(0)} \hat{w}^{(u)}$$

This might be accomplished by using $\hat{w}^{(u-1)}\hat{d}$ as the current expanded data matrix $\hat{d}$ in the expression for F. In some aspects, this is effected by designating a previous expanded discrete-time matrix (e.g., $\hat{x}^{(u-1)}$) to be the base expanded discrete-time matrix, $\hat{x}^{(0)}$.

Figure 1B:
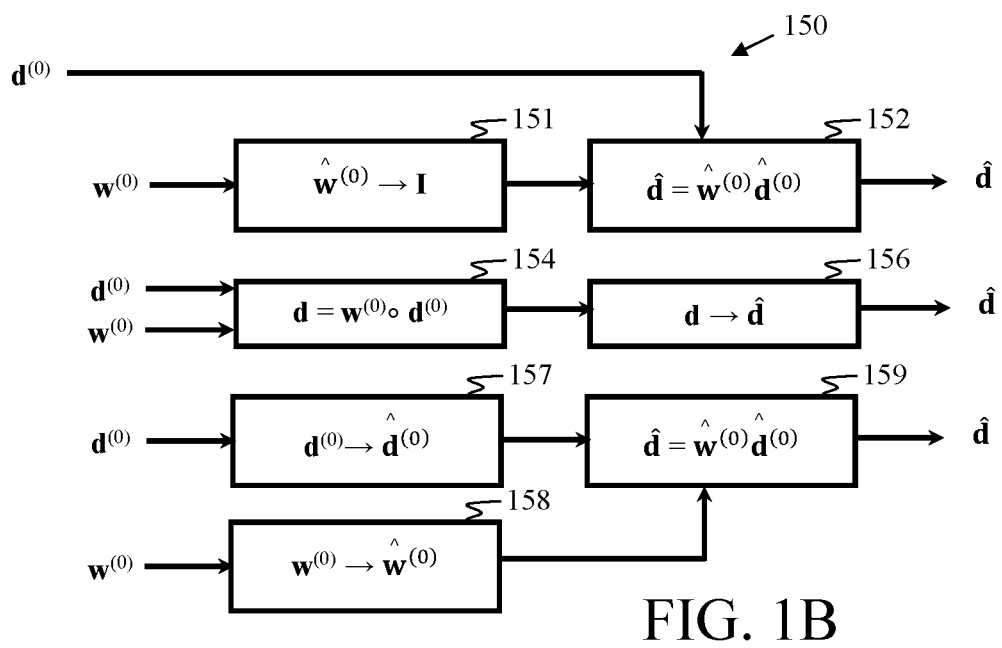
FIG. 1B is a flow diagram of example methods, functional components of an apparatus, and software modules according to aspects of the presents disclosure, and which may be implemented with any of the aspects disclosed herein.

FIG. 1B shows some aspects wherein the inverse of the base weight matrix $\hat{w}^{(0)-1}$, which may be the inverse of an initial weight matrix, $\hat{w}^{(0)}$, or the inverse of a previous update weight matrix, $\hat{w}^{(u-1)}$) may be removed from the computation for $\hat{x}^{(u)}$ (or $\Delta\hat{x}^{(u)}$). In an aspect, the base weight matrix is set to an Identity matrix 151, and the current expanded data matrix $\hat{d}$ may be provided via a matrix expansion (e.g., in 152) of previous data $d^{(0)}$ (e.g., an initial or previous data vector). For example, the previous data $d^{(0)}$ may be designated as the current data $d$. In an aspect, a Hadamard product 154 (or equivalent operation) is performed with initial or previous weights and data)($w^{(0)}$ and $d^{(0)}$), followed by matrix expansion 156, which effectively incorporates the weights $w^{(0)}$ into the current expanded data $\hat{d}$. In an aspect, previous data $d^{(0)}$ and previous weights $w^{(0)}$ are expanded (157 and 158, respectively), and the expanded matrices are multiplied together 159. In some aspects, a new $\hat{x}^{(0)}$ is selected from an updated expanded matrix from a previous iteration, In an aspect, subsequent update computations may be made to this new base $\hat{x}^{(0)}$ without employing inverse weights applied to any previous base. Aspects disclosed herein can be configured for multiplicative and additive updates.

Updates 108.1-108.U to $\hat{x}^{(0)}$ are depicted as each comprising a matrix multiplication of $\hat{x}^{(0)}$ with one of the $\hat{w}^{(u)}$ ($u=1, \ldots, U$) to produce $\hat{x}^{(u)}$. However, updates 108.1-108.U should be understood to comprise equivalent operations on $\hat{x}^{(0)}$. Some aspects provide for advantageously simple updates 108.1-108.U to the values in $\hat{x}^{(0)}$. For example, values in $\hat{w}^{(u)}$ that equal one require no update to corresponding $\hat{x}^{(0)}$ values, diagonal values in $\hat{w}^{(u)}$ that equal zero (i.e., the diagonal matrix $\hat{w}^{(u)}$ is sparse) can provide for deleting values or skipping subsequent calculations involving corresponding $\hat{x}^{(0)}$ values, values in $\hat{w}^{(u)}$ that equal minus-one change the signs of corresponding $\hat{x}^{(0)}$ values, and $\pi/2$ phase shifts can comprise sign updates to the Real and Imaginary values in $\hat{x}^{(0)}$. In some aspects, updates can be implemented as bit operations (e.g., bit shifts, bit permutations, etc.).

Each expanded matrix $\hat{x}^{(u)}$ ($u=0, \ldots, U$) is operated upon with a row summing operation (110.0-110.U), wherein the values in each row of an $\hat{x}^{(u)}$ are summed, thus reducing the number of columns (i.e., row elements) from MN to one to produce a corresponding discrete-time signal vector $x^{(u)}$ ($u=0, \ldots, U$). In an aspect, the elements $\hat{x}_{n',n''}^{(u)}$ in each row ($n'=0, \ldots, N'-1$) of an N'×N" matrix $\hat{x}^{(u)}$ are summed to convert $\hat{x}^{(u)}$ to an N'×1 matrix (i.e., vector) $x^{(u)}$. For example, $\hat{x}^{(u)}$ can be expressed as:

$$\hat{x}^{(u)} = \begin{vmatrix} \hat{x}_{0,0}^{(u)} & \hat{x}_{0,1}^{(u)} & \cdots & \hat{x}_{0,N''-1}^{(u)} \\ \hat{x}_{1,0}^{(u)} & \hat{x}_{1,1}^{(u)} & \cdots & \hat{x}_{1,N''-1}^{(u)} \\ \vdots & \vdots & \ddots & \vdots \\ \hat{x}_{N'-1,0}^{(u)} & \hat{x}_{N'-1,1}^{(u)} & \cdots & \hat{x}_{N'-1,N''-1}^{(u)} \end{vmatrix}$$

and a discrete-time signal vector resulting from this conversion can be expressed as:

$$x^{(u)} = \begin{vmatrix} x_0^{(u)} \\ x_1^{(u)} \\ \vdots \\ x_{N'-1}^{(u)} \end{vmatrix} = \begin{vmatrix} \hat{x}_{0,0}^{(u)} + \hat{x}_{0,1}^{(u)} + \cdots + \hat{x}_{0,N-1}^{(u)} \\ \hat{x}_{1,0}^{(u)} + \hat{x}_{1,1}^{(u)} + \cdots + \hat{x}_{1,N-1}^{(u)} \\ \vdots \\ \hat{x}_{N'-1,0}^{(u)} + \hat{x}_{N'-1,1}^{(u)} + \cdots + \hat{x}_{N'-1,N-1}^{(u)} \end{vmatrix}$$

This conversion can be regarded as a transformation of the data from a high-dimensional space to a space with fewer dimensions. This can be referred to as a feature projection or feature extraction, and can be implemented in various ways. This approach can be implemented with higher-dimensional data structures (such as tensors), and can reduce the dimensionality to a lower-dimension tensor (including a matrix or a vector, for example). The transformation can be linear or non-linear.

In some aspects, $x^{(u)}$ is a signal vector, such as a discrete-time signal, a frequency-domain signal, or an antenna-array (e.g., spatial-domain) signal vector. Signal vector(s) $x^{(u)}$ may be synthesized and one or more signals $x^{(u)}$ selected to be transmitted over a wireless channel in a wireless network. Disclosed aspects can perform updates to the expanded-matrix form of the signal vectors to adjust or select some predetermined measurable signal parameter in the resulting signal vector(s). Such signal parameters can include signal amplitude pattern, sparsity pattern, etc. Updates to an expanded matrix can be configured to change the signal parameters in the signal vector corresponding to the expanded matrix, such as the signal vector's data symbol value(s) (such as user data, control data, reference signal data, etc.), dynamic range, spreading code, precoding, resource element mapping, layer mapping, and/or pulse shape, for example. In some aspects, the vector $x^{(u)}$ might be a set of signal values transmitted or received by an antenna array in a given time interval. A corresponding measurable parameter(s) might be derived from an analysis (e.g., Principal Component, Independent Component, etc.) of the corresponding expanded matrix that indicates MIMO performance. Updates to the expanded matrix may provide for selecting and/or de-selecting transmit and/or receive antennas, such as to improve MIMO performance for a fixed subset of candidate MIMO antennas. MIMO performance can be characterized by sum rate, mean per-user rate, spectral efficiency, energy efficiency (e.g., ratio of sum rate to total energy consumption of the system), eigenvalue-based condition number, bit error probability, signal to interference plus noise ratio (SINR), outage probability, measures of correlation between spatial subchannels, Minimum Variance index, and may further account for CSI estimation overhead, computational complexity of spatial multiplexing, and inherent limitations due to the variability of the propagation channels.

In some aspects, the various updates can be performed via any of the techniques disclosed herein to generate U candidate data sets in a high-dimensional space. By way of example, the update weights can effect a selection of transmit antennas and/or receive antennas in a MIMO array, although other examples that employ other mixing matrices may alternatively be employed. Dimensionality reduction may be performed on the data matrix, or on a covariance or correlation of the data matrix for each update. Principal component analysis (PCA) may be employed, such as to reduce the original space to a space spanned by a few eigenvectors. In the MIMO example, this can be used to select MIMO array parameters. In an aspect, the objective is to reduce the number of active antennas, thereby reducing computational complexity for spatial multiplexing and/or reducing transmitted power. PCA can be performed via Singular Value Decomposition (SVD) on the updated expanded matrices or Eigenvalue Decomposition (ED) on a covariance or correlation matrix generated from the updated expanded matrices or updated vectors. Some aspects can employ kernel PCA. For example, a kernel method can be implemented for pattern analysis. Algorithms that can be implemented herein include the kernel perceptron, support vector machines (SVM), Gaussian processes, PCA, canonical correlation analysis, ridge regression, spectral clustering, and linear adaptive filters. Some aspects perform pattern analysis on the updated data, such as to determine types of relations (for example clusters, rankings, principal components, correlations, classifications) in datasets. Subsequent updates to the data may be based on such relations, and are referred to as data-driven updates. Various non-linear techniques that can be employed include manifold learning, such as Isomap, locally linear embedding (LLE), Hessian LLE, Laplacian eigenmaps, and methods based on tangent space analysis.

In one aspect, each vector $x^{(u)}$ can be processed for transmission 112. Transmission processing 112 can include coupling the signal to at least one antenna and transmitting the signal over a wireless channel. The plurality of vectors $x^{(u)}$ (u=0, . . . , U; or u=1, . . . , U) can be processed 112 concurrently or sequentially. In some aspects, processing 112 is communicatively coupled 119 to the weight generator 106 such that processing 112 of at least a first set of one or more vectors $x^{(u)}$ may also select or adapt the update(s) (e.g., weight generation 106) to produce a subsequent set of one or more vectors $x^{(u)}$. This can involve iterative updates to the weights, and thus, the vectors $x^{(u)}$. Accordingly, logical and physical implementations of aspects depicted by the figures can comprise parallel and/or pipelined processing configurations. In some aspects, extrinsic data configures weight generation 106.

Figure 2:
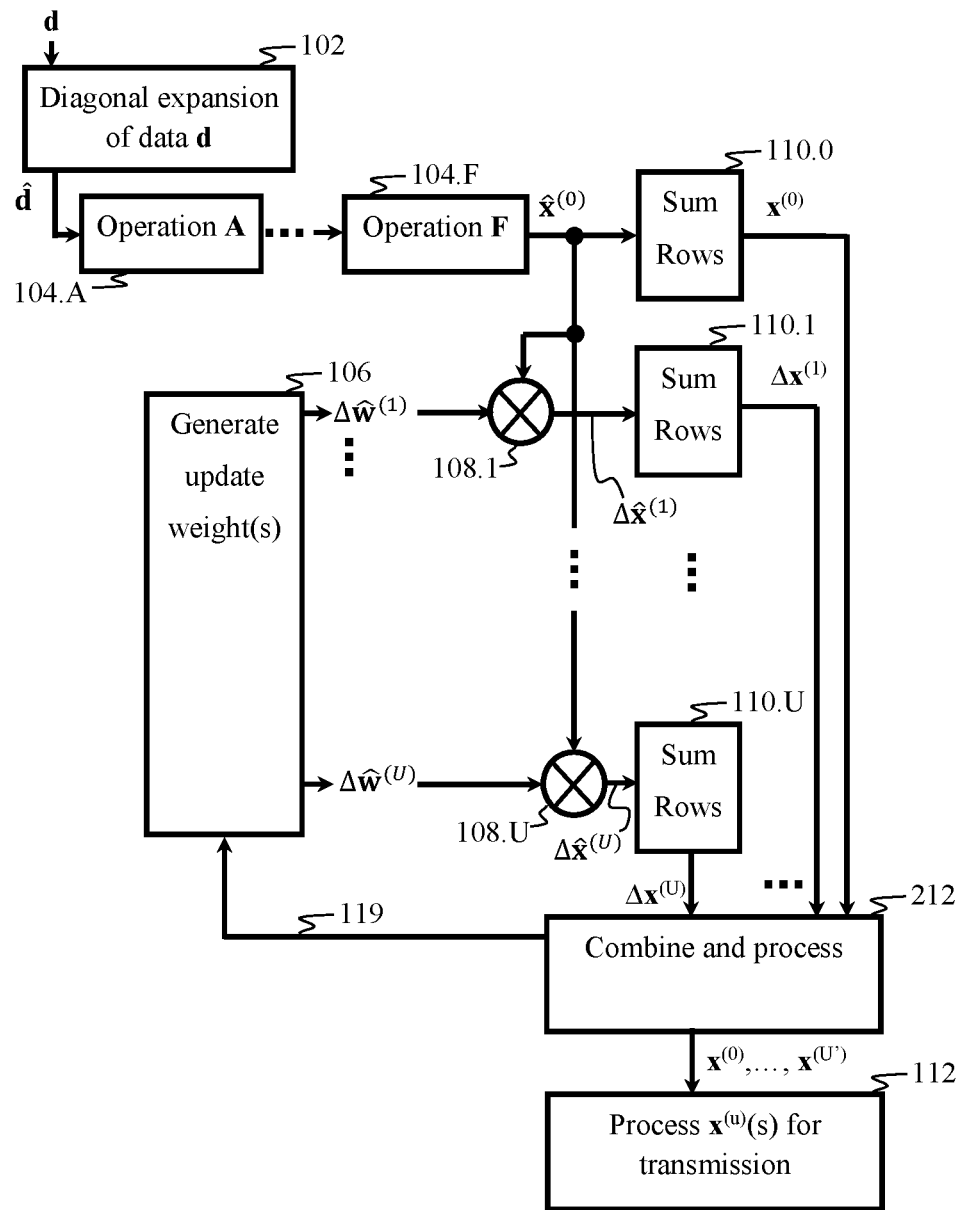

As depicted in FIG. 2, in some aspects, the update weight matrix $\hat{w}^{(u)}$ comprises an additive update $\Delta\hat{w}^{(u)}$ to a previous weight matrix: e.g., $\hat{w}^{(0)}$: $\hat{w}^{(u)}=\hat{w}^{(0)}+\Delta\hat{w}^{(u)}$. The additive update $\Delta\hat{w}^{(u)}$ may be a sparse matrix in the diagonal sense, wherein one or more of the diagonal values are zero. The additive update can change and, in some aspects, even erase values. It should be appreciated that an operation that erases data is not invertible in the usual sense. In some aspects, the erased data can be reconstructed using a constructor operator. In some aspects that employ an expression in which its derivation depends on the inverse of a singular matrix, a matrix pseudo-inverse may be employed. The Moore-Penrose method is an exemplary technique. In the case of a sparse diagonal matrix, each diagonal zero value can be replaced with a non-zero variable $\gamma_k$, followed by deriving the expression that involves the matrix inverse, and then computing the expression for the limit as each $\gamma_k$ approaches zero. This approach mimics the Residue Theorem used for integrating around singularities.

In an aspect, the elements in each row of $\hat{x}^{(0)}$ and $\Delta\hat{x}^{(u)}$ may be summed 110.0-110.U, wherein $\Delta\hat{x}^{(u)}=\hat{x}^{(0)}\Delta\hat{w}^{(u)}$ is an update expanded matrix, and the resulting base vector $x^{(0)}$ and update vector(s) $\Delta x^{(u)}$ added together in a combining process 212 and then may be processed for further updating 119 or processed for transmission 112. The combining 212 may produce multiple (U') different combinations of the vectors $x^{(0)}$ and $\Delta x^{(u)}$, and/or may combine multiple ones of the $\Delta x^{(u)}$ vectors together to generate the multiple U' candidates $x^{(u)}$. In another aspect, the order of combining 212 and summing 110.0-110.U may be switched. The update may be implemented as $\hat{x}^{(u)}=\hat{x}^{(0)}+\Delta\hat{x}^{(u)}$ in a process that combines 212 expanded matrices, where $\hat{x}^{(u)}$ is the $u^{th}$ updated expanded matrix. The elements in each row of each $\hat{x}^{(u)}$ can be summed 110.0-110.U to produce vector $x^{(u)}$.

Updates disclosed herein, such as multiplicative updates and additive updates, can be implemented in transmitters and/or receivers. For example, d can comprise a received signal vector (e.g., digital samples of a received signal). Various operations (such as decoding, transforms, etc.) might be performed on the received signal to produce d. One or more operations 104.A-104.F are performed on the diagonal expansion matrix $\hat{d}$ to produce base expanded matrix $x^{(0)}$, which, when operated upon by row summation 110.0, provides a data sequence $x^{(0)}$. Thus, $x^{(0)}$ can be referred to as a base expanded data-sequence matrix, or a base expanded data matrix. Multiplicative and/or additive updates (e.g., employing weights $\hat{w}^{(u)}$ and/or $\Delta\hat{w}^{(u)}$) can be made to $\hat{x}^{(0)}$ to effect one or more updates to the data sequence $x^{(0)}$ (e.g., $x^{(u)}$, u=1, . . . , U) without repeating the one or more operations 104.A-104.F. In some aspects, the weights (e.g., $\hat{w}^{(u)}$ and/or $\Delta\hat{w}^{(u)}$) can comprise filter weights, decoding weights, or combinations thereof.

Figure 3:
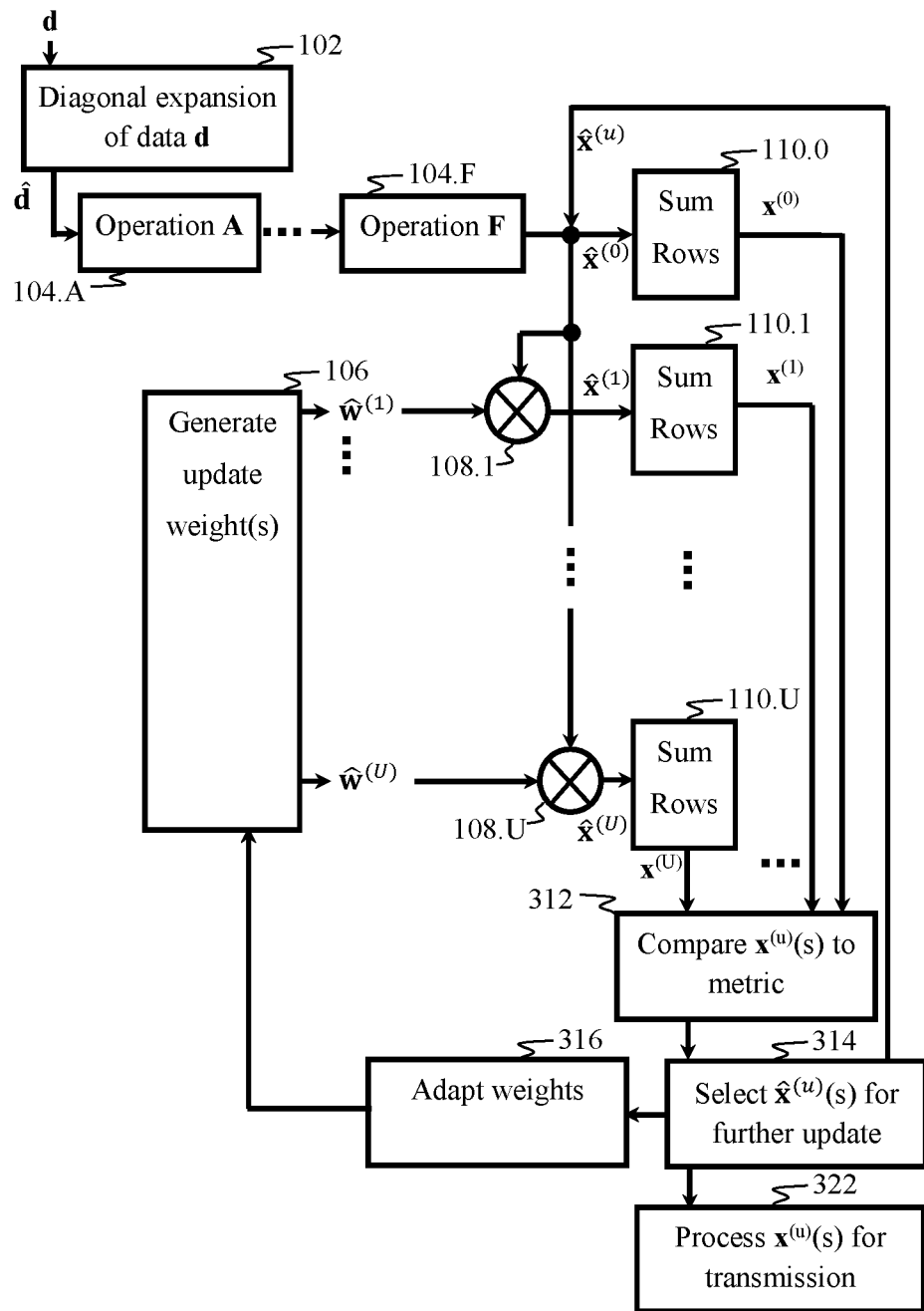

FIG. 3 depicts method and apparatus aspects wherein multiple iterations or multiple stages can be employed to produce a discrete-time signal for transmission. The plurality of vectors $x^{(u)}$ (u=0, . . . , U; or u=1, . . . , U) are compared 312 to some metric that is based on at least one desired feature of the signal which is improved by the update process. This can comprise measuring or computing each vector's $x^{(u)}$ feature(s), and comparing the features to the metric. The metric may be updated based on the features. Based on the feature(s), one or more of the $x^{(u)}$s can be selected 314 for further updates, whereupon the corresponding $\hat{x}^{(u)}$(s) can be updated in the same manner as $\hat{x}^{(0)}$. For example, a processing system can have memory configured to store data, such as expanded matrices $\hat{x}^{(u)}$, vector $x^{(u)}$, weights $\hat{w}^{(u)}$, the features, and/or the metric; and this data may be read from the memory and used for additional processing. Optionally, adaptation of the weights 316 may be performed for subsequent iterations. The adaptation 316 may be based on $x^{(u)}$ features of the current iteration and/or a history of feature measurements, weights, and/or changes to the weights. Upon satisfying at least one criterion (e.g., a threshold feature measurement, a predetermined number of iterations, etc.), at least one of the $x^{(u)}$(s) is selected, whereupon the $x^{(u)}$(s) may be further processed for transmission.

In one example, a computing system operating within a computing environment may receive a signal that includes current data about at least one of the base expanded discrete-time matrix, the base discrete-time signal vector, the updated expanded discrete-time matrix, and the updated discrete-time signal vector. In response to the received signal, the computing system may load, from a storage unit, historical data characterizing prior base expanded discrete-time matrices, base discrete-time signal vectors, updated expanded discrete-time matrices, and/or updated discrete-time signal vectors. For example, the above current data and/or historical data may comprise features of the matrices and/or vectors. Further, based on the current data, and on portions of the historical data, the computing system may compute updates that produce or improve one or more features in the updated matrices and/or vectors. The system may employ supervised learning, unsupervised learning, or both to determine the feature(s) that correspond to one or more desired signal properties in the wireless network, such as low MIMO condition number, a number of eigenvalues above a threshold value, low peak-to-average-power ratio (PAPR), low bit-error-rate, high bandwidth efficiency, low computational complexity, etc. The system may learn which update schemes enhance the features (and thus, the corresponding desired signal properties). Disclosed aspects can configure data into expanded matrices, and provide updates thereto for the purpose of adaptive filtering and/or classification.

In some aspects, the computing system may learn and/or detect the features, and/or provide the update based on an application of one or more machine learning algorithms or processes to input data that includes, but is not limited to, the current data and portions of the historical data. Examples of the one or more machine learning algorithms or processes include, but are not limited to, an association-rule algorithm (such as an Apriori algorithm, an Eclat algorithm, or an FP-growth algorithm), a clustering algorithm (such as a hierarchical clustering module, a k-means algorithm, or other statistical clustering algorithms), a collaborative filtering algorithm (such as a memory- or model-based algorithm), or an artificial intelligence algorithm (such as an artificial neural network).

Figure 4:
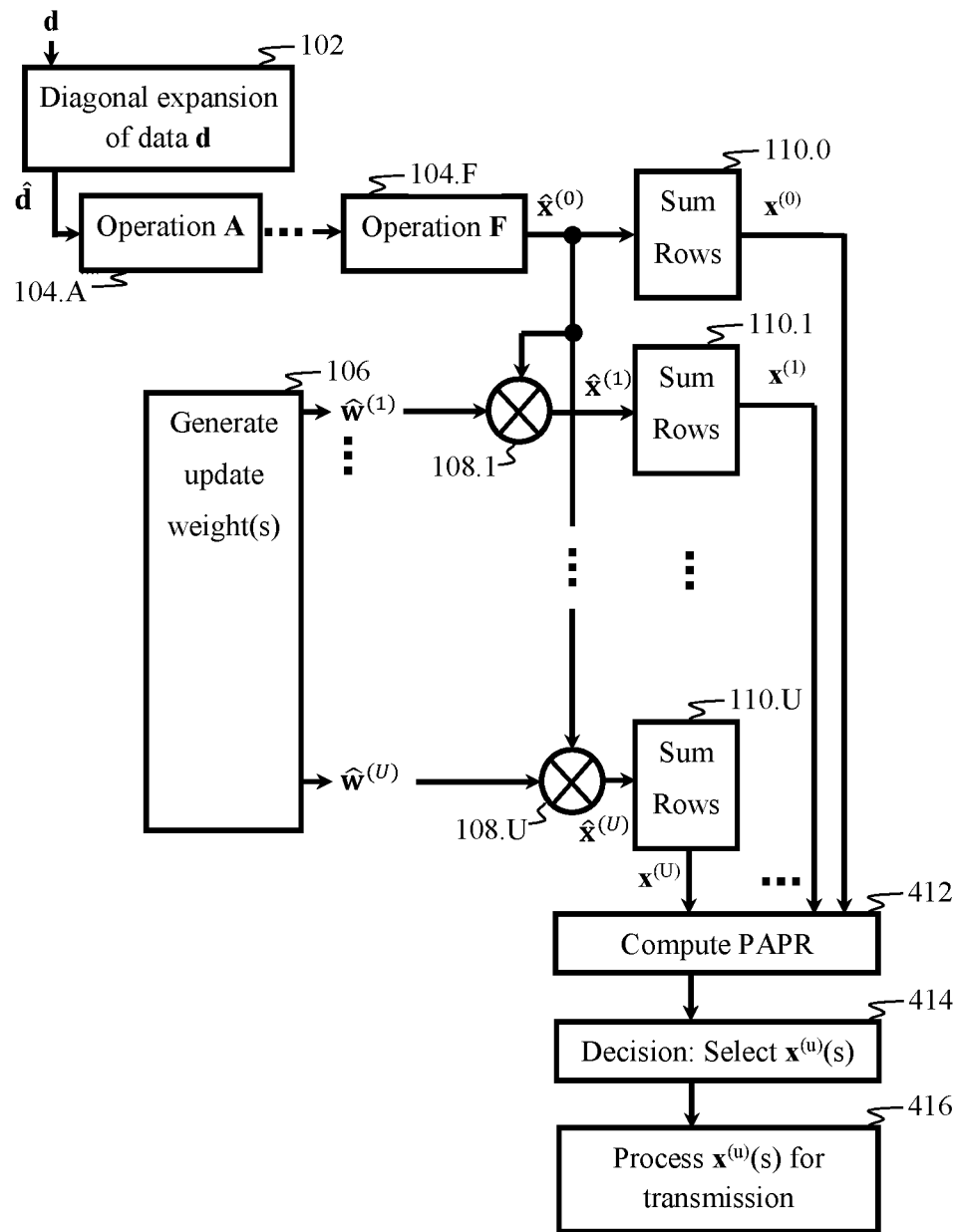

In FIG. 4, one of the operations, such as Operation F (104.F), may be an IFFT, for example. In some aspects, the input to 104.F may comprise precoded data symbols, such as data symbols $d=[d_0\ d_1\ \ldots\ d_{N-1}]^T$ precoded with an N×N precoding operator S, which can comprise transform precoding, CDMA precoding, Zadoff-Chu coding, space-time block coding, spatial multiplexing (e.g., MIMO) precoding, SVD MIMO precoding, transmit diversity precoding, space-time block coding, or any combinations thereof. The output of the IFFT (e.g., 104.F) is an expanded discrete-time matrix $\hat{x}^{(0)}$. The weights updates to $\hat{x}^{(0)}$, provide for a set of updated expanded discrete-time matrices $\hat{x}^{(u)}$ from which candidate discrete-time signals $x^{(u)}$ can be produced. In some aspects the weights $\hat{w}^{(u)}$ can provide for any combination of selective mapping, partial transmit sequence (PTS) scheme, dummy symbol insertion (e.g., in any resource units, such as tones, MIMO channels, multiple-access codes, etc.), data-symbol swapping, changing the order of data symbols, symbol constellation offset (such as dithering, perturbing, scaling, mapping, offsetting, transforming, deforming, phase-shifting, and/or rotating symbol constellations). Peak-to-Average-Power Ratio (PAPR) measurements 412 are computed for each candidate, and the candidate signal $x^{(u)}$ with the best PAPR metric (e.g., lowest PAPR) can be selected 414 for processing 416 to generate the discrete-time transmission signals.

The PAPR of a signal $x_n(t)$ can be computed from $$PAPR = \frac{\max_{0 \le t \le NT} |x_n(t)|^2}{E[|x_n(t)^2|]} = \frac{\max_{0 \le t \le NT} |x_n(t)|^2}{\frac{1}{NT}\int_0^{NT} |x_n(t)|^2 dt}$$

where E[•] denotes the expected value. The complementary cumulative distribution function (CCDF) is a frequently used performance measure for PAPR, which is the probability that the PAPR of a signal exceeds a given threshold, $PAPR_0$, which is denoted as $CCDF=Pr(PAPR>PAPR_0)$. Other PAPR performance measures may be used, such as peak amplitude, crest factor, or PAPR normalized with respect to shaping gain. PAPR, as used herein, can refer to any of the PAPR performance measures or PAPR-based metrics disclosed herein. The reduction in PAPR results in a system that can either transmit more bits per second with the same hardware, or transmit the same bits per second with lower power and/or less-expensive hardware. Some aspects, for example, can produce a greater number of candidate discrete-time signals for given processing constraints, thus increasing the likelihood that a signal with low PAPR can be found.

Figure 5:
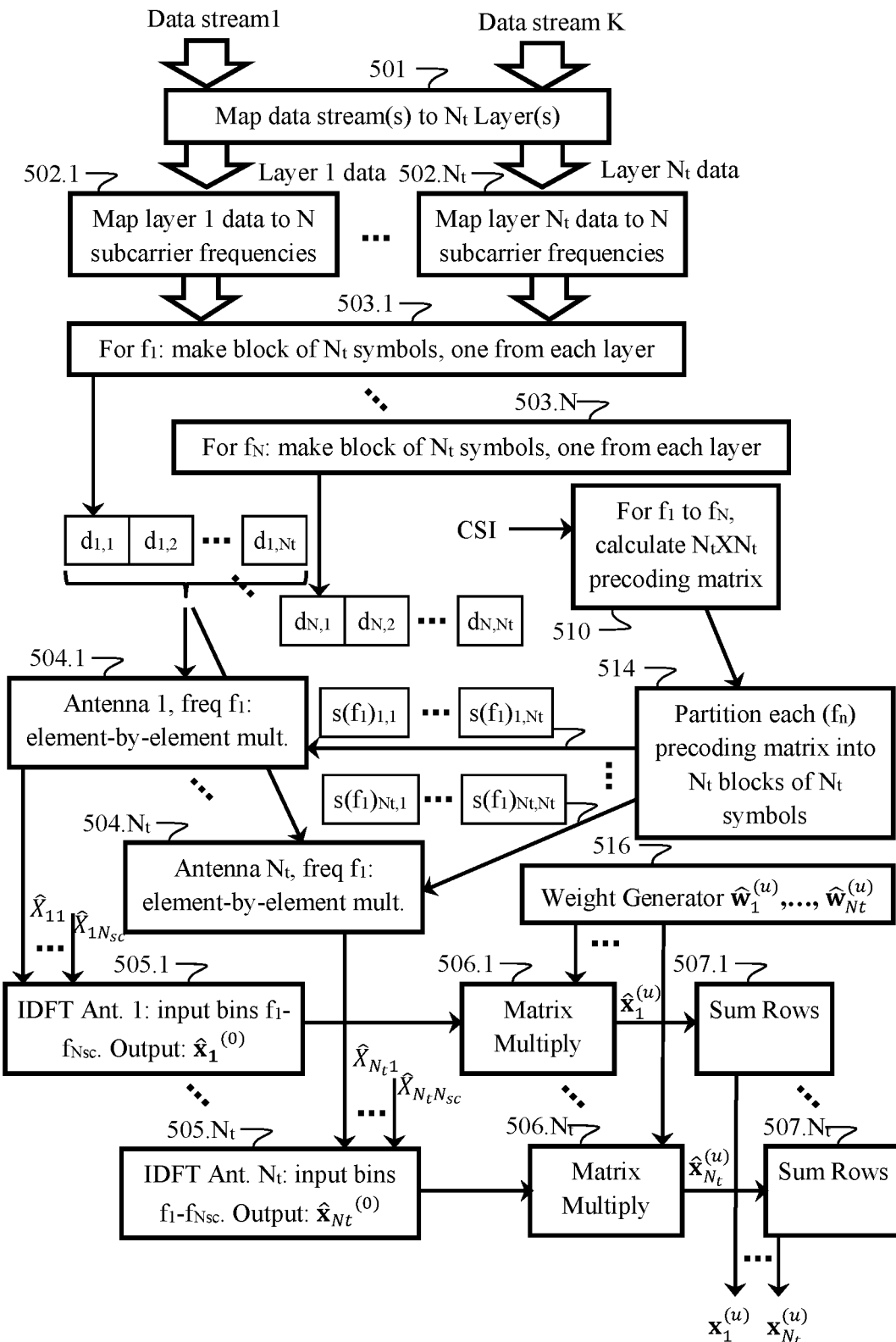

In FIG. 5, a MIMO-OFDM transmitter maps 501 one or more (K) data streams to as many as $N_t$ layers. The MIMO-OFDM transmitter may comprise a single-terminal device with multiple antennas thereon, a distributed antenna system residing on multiple terminals, or some combination thereof. The MIMO-OFDM transmitter may comprise UEs (e.g., UEs with multiple antennas and/or UEs configured as a cooperative array, wherein the UEs can be networked together and/or to a hub, such as via D2D, near-field, and/or other links), network infrastructure terminals (e.g., base stations, gNodeB's, remote radio heads, relays, repeaters, hubs, gateways, and/or other server-side and/or intermediate network devices), or some combination thereof.

Data in each layer is mapped 502.1-502.$N_t$ to $N_{SC}$ subcarrier frequencies (such as OFDM tones). For each frequency ($f_1, \ldots, f_{N_{SC}}$), data is arranged 503.1-503.$N_t$ in blocks of $N_t$ symbols. The transmitter may employ channel state information (CSI) to calculate precoding matrices. For example, for each of the $N_{SC}$ frequencies ($f_n$), an $N_t \times N_t$ precoding matrix $s(f_n)$ can be computed 510. These precoding matrices can multiply 504.1-504.$N_t$ data blocks from each of the processes 503.1-503.$N_t$, and may include a step of partitioning 514 each of the $N_{SC}$ precoding matrices into $N_t$ blocks of $N_t$ symbols. The multiplication 504.1-504.$N_t$ comprises an element-by-element multiplication of the data and precoding values to generate expanded precoded data values $\hat{X}_{11}, \ldots, \hat{X}_{1N_{SC}}, \ldots, \hat{X}_{N_t 1}, \ldots, \hat{X}_{N_t N_{SC}}$. The expanded precoded data (comprising $N_{SC}$ rows) corresponding to antenna 1 is operated on by a first $M \cdot N_{SC}$-point IDFT 505.1 to generate an initial expanded matrix $\hat{x}_1^{(0)}$, which is an expansion of the length-$M \cdot N_{SC}$ discrete-time vector corresponding to antenna 1. Similar operations are performed for the other $N_t - 1$ antennas. For example, initial expanded matrix $\hat{x}_{N_t}^{(0)}$ is generated for antenna $N_t$. Weight generator 516 generates candidate weight sets $\hat{w}_1^{(u)}, \ldots, \hat{w}_{N_t}^{(u)}$ for each antenna, and a multiplication 506.1-506.$N_t$ of the corresponding weights and initial expanded matrices for each antenna generates an updated (candidate) expanded matrix $\hat{x}_1^{(u)}, \ldots, \hat{x}_{N_t}^{(u)}$. The rows of each of the updated expanded matrices are summed 507.1-507.$N_t$ to produce the candidate sets of discrete-time signals $x_1^{(u)}, \ldots, x_{N_t}^{(u)}$. The processing described herein can be adapted for parallel, sequential, and/or partial update techniques. It should be appreciated that elements of the matrices disclosed herein can each comprise a matrix (i.e., a submatrix).

The update MIMO-OFDM signal for each antenna (e.g., antenna 1) has the form:

$$\hat{x}_1^{(u)} = \hat{x}_1^{(0)} \hat{d}_1^{-1} \hat{w}_1^{(u)} \hat{d}_1$$

The associative property of matrix multiplication along with the commutative property of multiplication for diagonal matrices of the same size (i.e., for $\hat{d}_1^{-1}$, $\hat{w}_1^{(u)}$, and $\hat{d}_1$) can be exploited to further simplify the above expression to:

$$\hat{x}_1^{(u)} = \hat{x}_1^{(0)} \hat{w}_1^{(u)}$$

This is enabled by the formatting of data symbols and weights into matrices ($\hat{d}_1$ and $\hat{w}_1^{(u)}$, respectively) that commute under multiplication. These matrices might be diagonal matrices or Toeplitz matrices (e.g., Circulant matrices). Row summation is performed relative to each antenna to produce each updated discrete-time (MIMO-)OFDM signal $x^{(u)}$. For each updated (candidate) weight matrix set, there is a corresponding set of updated (candidate) MIMO-OFDM signals that can be transmitted from the $N_t$ antennas. Properties of the signals (e.g., MIMO performance, PAPR, etc.) may be measured or computed, compared to a threshold value(s), and candidate signals may be selected based on the comparison.

In an aspect, PAPR of the discrete-time MIMO-OFDM signal $x^{(u)}$ is computed for at least one of the $N_t$ antennas. A PAPR-based metric may be computed from the PAPR measurements. Either the PAPRs or the PAPR-based metrics may be compared for multiple weight matrix sets, and the weight matrix set (and/or discrete-time signal $x^{(u)}$) having the best PAPR or PAPR-based metric can be selected. PAPR reduction may be performed for certain ones of the antennas. In some aspects, the metric might be a function (e.g., maximum, mean, average, etc.) of PAPR for multiple ones of the antennas. Based on the selection, a transmit MIMO-OFDM signal is synthesized and transmitted from the $N_t$ antennas.

In some aspects, the weighting matrices can provide for additive updates (including techniques that employ sparse matrices). Thus, the weighting matrices can be configured in a partial update method for generating candidate MIMO-OFDM signals. The weight matrices may provide updates to precoding, the data symbols, or both. The weight matrices may update layer mapping and/or resource mapping. For example, a weight matrix may update how data symbols are mapped to a predetermined set of resource units and/or layers. Update techniques can include updating an antenna selection, such as selecting which antennas in an antenna array (e.g., a MIMO array) are activated.

Figure 6:
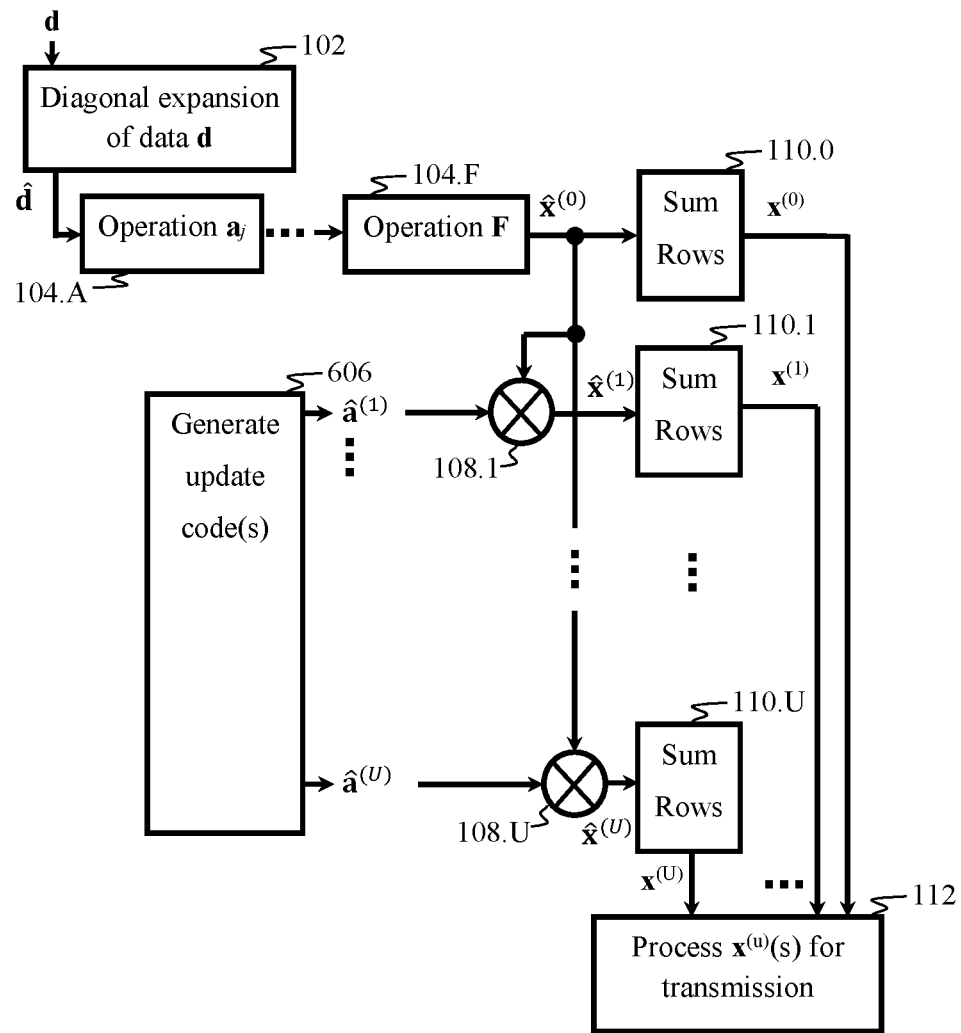

In FIG. 6, a method and apparatus are provided for updating a coding operation 104.A performed on input data d. In one example, a data symbol $d_i$ is encoded (e.g., spread) with a length-N code vector $a_j$ by the coding operation 104.A in a manner that is functionally equivalent to the following mathematical operations. Data symbol $d_i$ is repeated N times to produce length-N data vector d. Operation 104.A can perform a Hadamard product $x_a^{(0)} = a_j \circ d$, followed by a diagonal matrix expansion of the product, wherein the diagonal elements of expanded matrix $\hat{x}_a^{(0)}$ are the values of $x_a^{(0)}$.

Additional operation(s) (e.g., 104.F) can be performed on the expanded matrix $\hat{x}_a^{(0)}$ to produce $\hat{x}^{(0)}$, which is an expanded matrix of the encoded data. One or more (u) code updates $\hat{a}^{(u)}$ are provided 606 (e.g., generated or retrieved from memory), and employed to update the base or previous expanded matrix ($\hat{x}^{(0)}$), which is generated and/or retrieved from memory:

$$\hat{x}^{(u)} = \hat{x}^{(0)} \hat{a}^{(u)}$$

It should be appreciated that code updates $\hat{a}^{(u)}$ can be referred to as weights. In some aspects, a code update $\hat{a}^{(u)}$ can comprise a scalar multiplier that effects an update to data symbol $d_i$, such as to change $d_i$ from one symbol value to another symbol value. In other aspects, updates to the data can be performed independently from the code updates. Disclosed aspects related to code updates can be implemented in a transmitter that employs code index modulation. In an aspect, the codes $a_j$ have a frequency-domain signature characterized by a sparsity pattern of OFDM tones (subcarrier frequencies), and the updates $\hat{a}^{(u)}$ can be configured to update the frequency-domain signature of the transmission. This aspect may be employed to effect OFDM index modulation.

By way of example, binary codes are efficiently updated, since −1 code values result in only a sign change to corresponding values in the expanded matrix $\hat{x}^{(0)}$, and +1 values result in no changes. In some aspects, code update 606 can be implemented in an additive update system, such as depicted in FIG. 2. Thus, code updates $\hat{a}^{(u)}$ can comprise sparse diagonal matrices, wherein one or more of the diagonal values are zero. In the case of ternary codes, for example, additive or multiplicative updates $\hat{a}^{(u)}$ can be sparse diagonal matrices.

Aspects disclosed herein can employ Gray codes, Inverse Gray codes, Walsh codes, Gold codes, Golay codes, CI codes, maximal-length sequences, Barker codes, Kasami codes, Zadoff-Chu codes, chirp codes, Reed-Muller codes, quadratic residue codes, twin prime, ternary codes, quaternary codes, higher-order codes, vector signaling codes, polar codes, and adaptations thereof, such as concatenating, truncating, cyclic shifting, superimposing, combining via element-wise multiplication, and/or inserting zeros into any of the aforementioned codes. Sparse codes can have non-zero elements that are drawn from orthogonal or non-orthogonal code dictionaries, which can include any of the codes mentioned herein.

In some aspects, operation 104.A is followed by DFT-spreading, which outputs frequency-domain symbols. These symbols are mapped to input frequency bins of an IFFT, which generates expanded discrete-time matrix $\hat{x}^{(0)}$. In this case, $x_a^{(0)}$ is a time-domain sequence. In some aspects, it is advantageous to perform an operation in one domain (e.g., time domain) to effect an operation in another domain (e.g., frequency domain), the relationship between the domain operations being defined by the transform properties. For example, a frequency shift may be implemented by multiplying an encoded sequence x[n] (or a code sequence) with a phase shift:

$$e^{i\phi n}x[n] \overset{DTFT}{\to} X(e^{i(\omega - \phi)})$$

wherein ω is the frequency of the corresponding frequency-domain samples of X( ), and φ indicates a phase shift applied to a code sequence or coded sequence x[n], which results in a frequency offset of the X( ) samples. The phase shift can be a code update. In disclosed aspects, the code update can operate on the expanded discrete-time matrix $\hat{x}^{(0)}$ to effect a desired frequency-domain operation, thus avoiding the need to repeat DFT-spreading, resource-element mapping, and the IFFT. This reduces computational complexity.

In one aspect, a phase-shift update to $\hat{x}^{(0)}$ can provide a cyclic shift in the corresponding frequency-domain symbols. This can be useful in systems that employ receivers that perform decoding in the frequency domain, as some disclosed aspects can efficiently change the transmitted frequency-domain codes via updates to the expanded discrete-time signal $\hat{x}^{(0)}$, additive updates in the expanded discrete-time signal space, and other operations in the expanded discrete-time signal space. In some aspects, code sequence $a_j$ has a corresponding frequency-domain code space $\alpha_j$ that is sparse (i.e., one or more values of $\alpha_j$ are zero), and the code updates to $\hat{x}^{(0)}$ provide for updates to the sparse frequency-domain code $\alpha_j$. The code sequence $a_j$ can be configured to have a first predetermined sparsity pattern (i.e., a pattern of non-zero elements) in the frequency domain, and updates to) $\hat{x}^{(0)}$ can be configured to provide an updated sequence (e.g., $x^{(u)}$) having a second frequency-domain sparsity pattern. The sparsity patterns may be the same or different. A phase-shift update to $\hat{x}^{(0)}$ can be operable to remap (i.e., change the mapping of) the DFT-spread symbols to the IFFT inputs, which effectively updates resource unit (e.g., resource element) mapping.

Other transform properties can be exploited in a similar manner as disclosed herein, including, but not limited to transform properties associated with time shifting, convolution, correlation, multiplication, modulation, scaling, and filtering. Aspects disclosed herein can be configured with respect to any of the Fourier transforms and/or other transforms mentioned herein.

Figure 7:
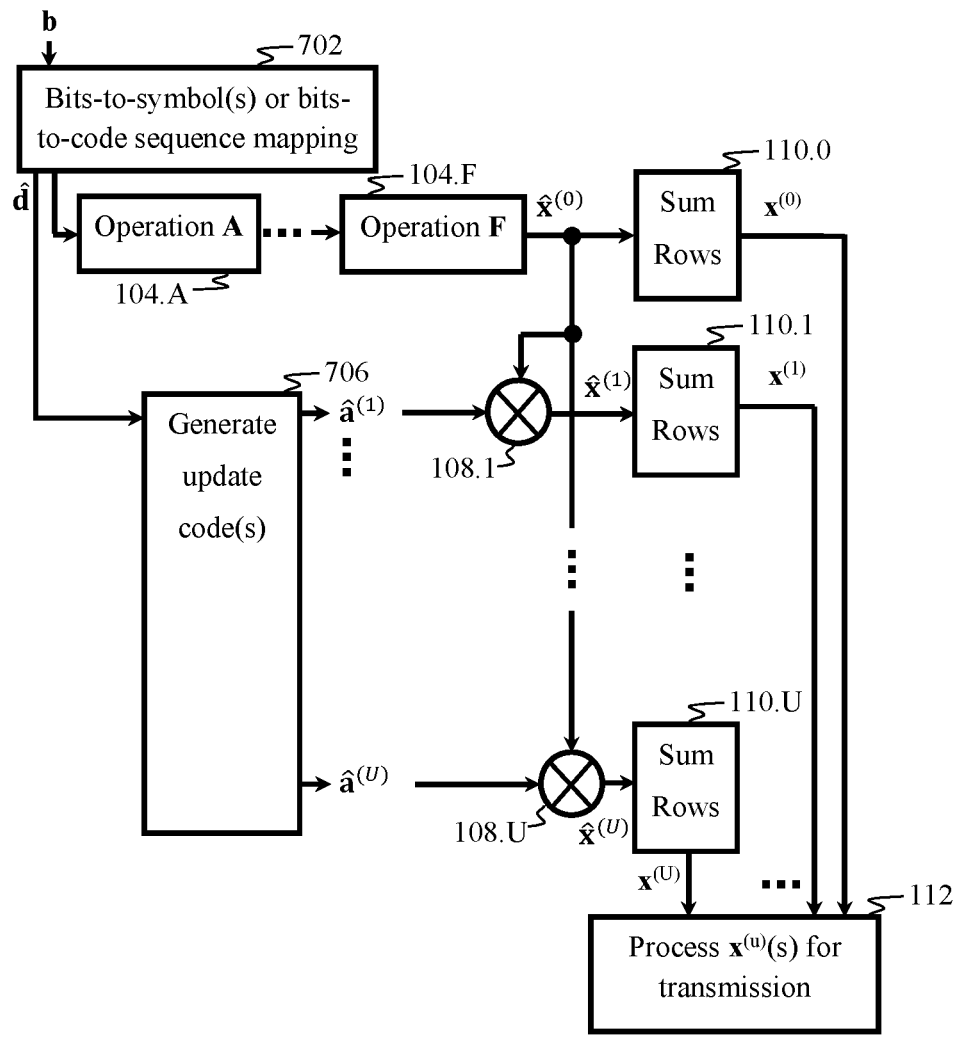

In FIG. 7, a NOMA scheme, such as sparse code multiple access (SCMA) can be performed. A plurality of data bits b in each layer are mapped 702 to data symbols or to one or more code sequences $a_j$, wherein the output can be formatted as a diagonal matrix expansion $\hat{d}$. The mapping 702 can employ one or more codebooks. For example, each layer may have its own codebook. The data d can comprise one or more data symbols spread with the one or more code sequences. Operations A-F (104.A-104.F) can comprise DFT spreading, followed by resource element mapping, followed by an IFFT. Code sequence $a_j$ can be selected such that its frequency-domain code space $\alpha_j$ is effectively an SCMA codeword. The output of the IFFT, for example, Operation F (104.F), is an expanded discrete-time matrix)) $\hat{x}^{(0)}$ of a discrete-time SCMA signal. Updates to the code sequence(s) $a_j$, and thus the corresponding SCMA codeword(s) $\alpha_j$, may be generated or read from memory (706). Multiplicative update(s) 108.1-108.U (or additive updates 212) performed on $\hat{x}^{(0)}$ in disclosed aspects can effectively change the SCMA codeword(s). An SCMA receiver can demodulate the received OFDM-SCMA signals (e.g., with an FFT) and decode the frequency-domain symbols based on a message-passing algorithm, successive interference cancellation, or other advanced-receiver design. UE codebooks can assist the receiver in decoding received signals. Disclosed aspects can be configured for decoding operations in a NOMA receiver.

In one aspect, codewords employed by each layer have a layer-specific sparsity pattern, which may differ from sparsity patterns associated with other layers. Code sequence $a_j$ can be selected to provide $x^{(0)}$ with an SCMA sparsity pattern corresponding to a first layer (e.g., a first code book), and code updates 706 to the base expanded discrete-time matrix $\hat{x}^{(0)}$ can provide for updated discrete-time sequences $x^{(u)}$ with the same SCMA sparsity pattern. In one aspect, a base code sequence $a_0$ having a predetermined SCMA sparsity pattern (such as corresponding to a codebook for layer 1) is provided to Operation(s) 104.A-104.F to produce the base expanded discrete-time matrix $\hat{x}^{(0)}$. As the transmitter receives layer 1's data bits, it arranges the bits into blocks, and the bits-to-code sequence mapping 702 regulates the generation (or selection) 706 of matrix-expansion updates $\hat{a}^{(u)}$ for each block, which produce discrete-time sequences $x^{(u)}$ with the same sparsity pattern as $a_0$. This can constitute codeword mapping. This can be performed in serial and/or in parallel. In some aspects, each block is mapped to more than one codeword. In some aspects, codewords may be summed, which can be implemented by summing two or more of the discrete-time sequences $x^{(u)}$. Updates 108.1-108.U can be made: $\hat{x}^{(u)}=\hat{x}^{(0)}\hat{a}^{(u)}$, followed by row summing 110.1-110.0 and processing 112. The transmitter can be configured to generate SCMA signals for multiple layers. In some aspects, symbol-to-codeword mapping effected by 702 and 706 can comprise providing for updates that cause the updated sparsity pattern(s) (e.g., for $x^{(u)}$) to differ from the base sparsity pattern (e.g., for $x^{(0)}$). This might be done to configure a transmitter to process different layers, when there is a codebook change, or when a codebook calls for changing the layer's sparsity pattern.

In some aspects, FIG. 7 can be configured to implement code-sequence index modulation, wherein the code sequences are configured to have SCMA frequency-domain signatures. In some aspects, FIG. 7 can be configured to implement OFDM index modulation (OFDM-IM) by providing for code sequence index modulation, wherein the code sequences are designed to have different frequency-domain sparsity patterns. These sparsity patterns can include different active OFDM tone patterns, including different numbers of active OFDM tone patterns (subcarrier number index modulation). By way of example, mapping 702 can perform a bits-to-code-index mapping, and each code index is then input to update 706 to generate the code update(s). The update(s) can have the form of a code-sequence update, which indirectly effects an SCMA code update or sparsity pattern update without repeating the IFFT (and possibly other functions). This can significantly improve computational efficiency. The updates can be implemented via multiplicative and/or additive updates disclosed herein. In some aspects, some of the data bits are mapped to data symbols (e.g., in 702), which are then effectively modulated onto index-modulation selections of SCMA codewords or individual ones of the OFDM-IM tones via the generation or selection of update codes 706. For example, data symbol modulation and code index modulation can be combined in 706 by configuring the generation or selection of updates $\hat{a}^{(u)}$ that result in discrete time sequences $x^{(u)}$ having the desired frequency-domain signature (i.e., SCMA codewords or OFDM-IM tones with data symbols modulated thereon). In other aspects, data symbol modulation may be performed separately from (e.g., following) index modulation.

Figure 8:
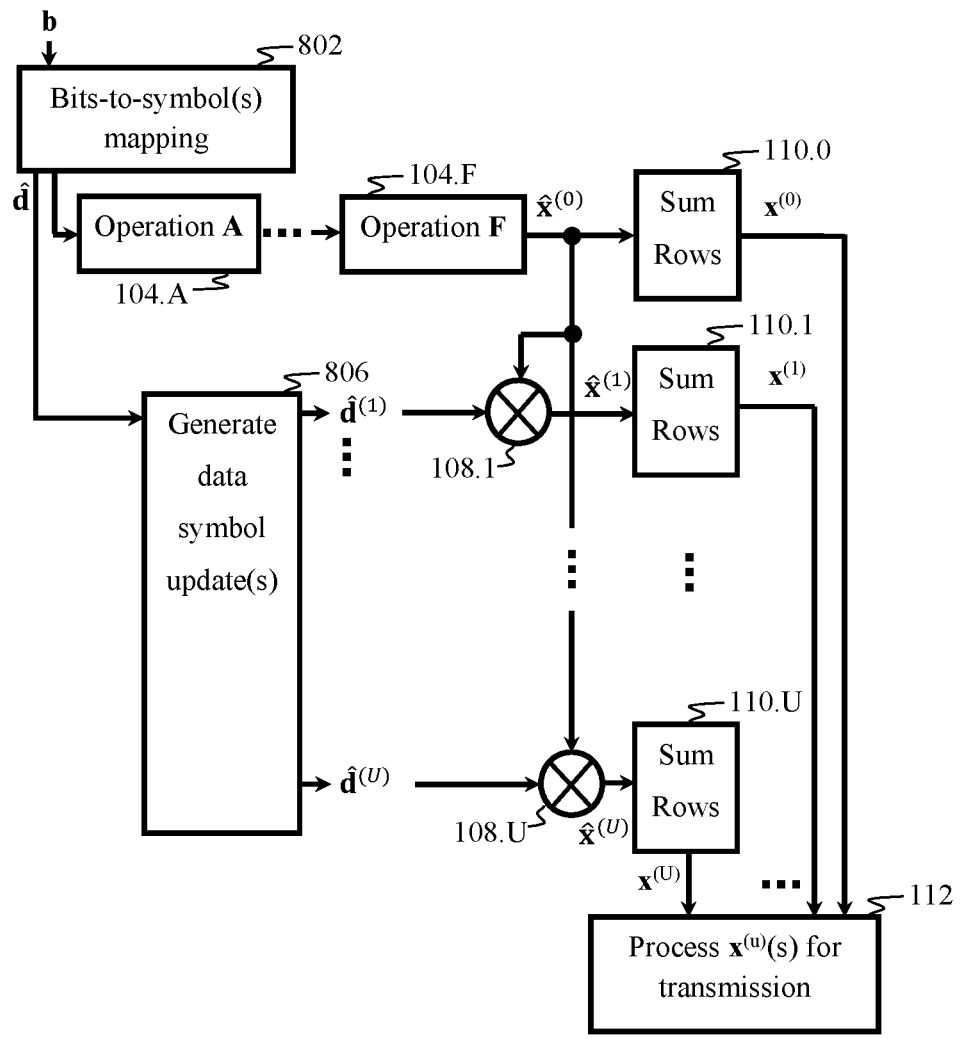

FIG. 8 illustrates method and apparatus aspects that can be configured to generate data-modulated waveforms for transmission, and/or possibly other uses. By way of example, bits-to-symbol(s) mapping 802 can map an initial block of data bits b to one or more data symbols that are processed by one or more processing blocks 104.A-104.F to produce at least one base expanded matrix $\hat{x}^{(0)}$, such as a base expanded discrete-time matrix. Bits-to-symbol(s) mapping 802 can map one or more subsequent blocks of data bits b to one or more subsequent data symbols, which symbol update module 806 can use to generate one or more update updates $\hat{d}^{(u)}$ (which can be referred to as weights). In some aspects, bits-to-symbol(s) mapping 802 directly maps bits to the symbol update(s) $\hat{d}^{(u)}$. The symbol updates $\hat{d}^{(u)}$ can be employed in one or more multiplicative updates 108.1-108.U (and/or additive update(s)) to produce one or more updated expanded matrices $\hat{x}^{(u)}$. Row summation 110.0-110.U can precede additional processing, such as processing for transmission 112.

Disclosed aspects can be combined. For example, updates disclosed herein can effect updates (referred to generally as update weights $\hat{w}^{(u)}$) to multiple signal parameters of the discrete-time signal $x^{(0)}$, including updates to data symbol values modulated thereon and at least one of the Operations 104.A-104.F, and updates to multiple ones of the Operations 104.A-104.F. In some aspects, multiple updates can be made concurrently via application of an update weight $\hat{w}^{(u)}$ to an expanded matrix (e.g., $\hat{x}^{(0)}$). In other aspects, multiple updates can be made iteratively or serially, such as by employing a first (multiplicative and/or additive) update to a first expanded matrix to produce a first updated expanded matrix, followed by employing at least a second (multiplicative and/or additive) update to the first updated expanded matrix to produce at least a second updated expanded matrix. In some aspects, the order of disclosed operations may be rearranged. In one aspect, data modulation follows waveform generation.

In some aspects, a network device (e.g., a UE, base station, relay, or group thereof) employs an operating signal processing component with a signal coding/decoding component (in conjunction with one or more processors, memories, transceivers, RF front ends, and antennas) to generate a base expanded matrix based on data to be transmitted in a wireless communication network, or based on samples of a received signal in the network; update values in at least one column of the base expanded matrix to produce an updated matrix; and sum values in each row of the updated matrix to produce a signal vector. In a transmit mode, the signal vector may be processed for transmission as a discrete-time signal. Alternatively, in a receive mode, the signal vector may be further processed, such as to provide for demultiplexing, decoding, filtering, etc.

Figure 9:
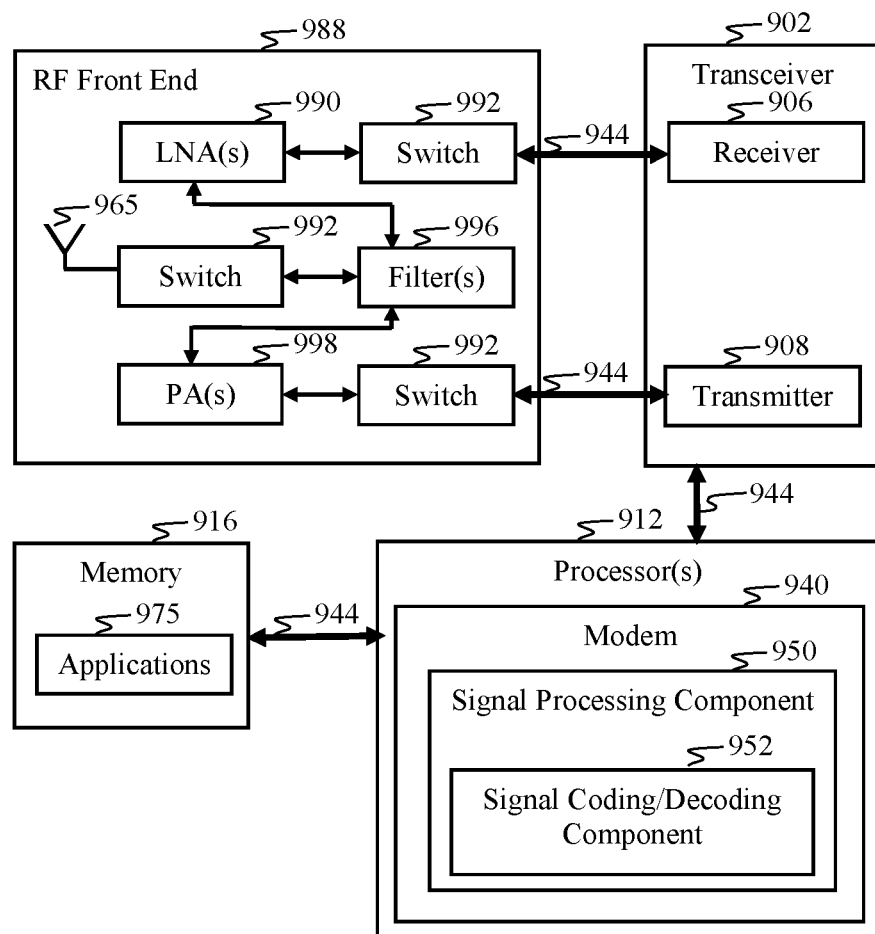
FIG. 9 is a schematic diagram of example components of a network device, such as a UE, that can be configured according to aspects of the presents disclosure.

FIG. 9 is an example implementation of a UE, which may include a variety of components, such as one or more processors 912, memory 916, and transceiver 902 in communication via one or more buses 944, which may operate in conjunction with modem 940, signal processing component 950, and signal coding/decoding component 952 to enable one or more of the functions described herein. The one or more processors 912, modem 914, memory 916, transceiver 902, RF front end 988, and one or more antennas 986 may be configured to support communications (simultaneously or non-simultaneously) in one or more radio access technologies. In some implementations, at least one of the RF front end 988, transmitter 908, and modem 940 may comprise or form at least a portion of means for transmitting a communication signal. In some implementations, at least one of the RF front end 988, receiver 968, and modem 940 may comprise or form at least a portion of means for receiving a communication signal.

In an aspect, the one or more processors 912 can include a modem 914 that uses one or more modem processors. The various functions related to signal processing component 950 and signal coding/decoding component 952 may be included in modem 140 and/or processors 1212 and, in an aspect, can be executed by a single processor. In other aspects, different ones of the functions may be executed by a combination of two or more different processors. For example, in an aspect, the one or more processors 912 may include any one or any combination of a modem processor, a baseband processor, a digital signal processor, a transmit processor, a receiver processor, or a transceiver processor associated with transceiver 902. In other aspects, some of the features of the one or more processors 912 and/or modem 940 associated with signal processing component 950 and signal coding/decoding component 952 may be performed by transceiver 902.

Memory 916 may be configured to store data used herein and/or local versions of applications 975 or signal processing component 950 and/or one or more of its subcomponents being executed by at least one processor 912. Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining signal processing component 950 and/or one or more of its subcomponents, and/or data associated therewith, when the UE is operating at least one processor 912 to execute signal processing component 950 and/or one or more of its subcomponents.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, the UE may include RF front end 988, which may operate in communication with one or more antennas 965 and transceiver 902 for receiving and transmitting radio transmissions. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

The PA(s) 998 may be used by RF front end 988 to amplify a signal for an RF output at a desired output power level. In an aspect, RF front end 988 may use one or more switches 992 to select a particular PA 998 and its specified gain value based on a desired gain value for a particular application. In an aspect, the PA(s) 998 may have programmable (or otherwise selectable) back-off values. The PA(s) 998 back-off may be selectable by one or more processors 912 based on the computed PAPR for a discrete-time transmit signal (e.g., $x^{(u)}$).

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that the UE can communicate with, for example, one or more base stations or one or more wireless networks. In an aspect, for example, modem 940 can configure transceiver 902 to operate at a specified frequency and power level based on the UE configuration and the communication protocol used by modem 940.

In an aspect, modem 940 can be a multiband-multimode modem, which can process digital data and communicate with transceiver 902 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols (e.g., radio access technologies). In an aspect, modem 940 can control one or more components of the UE (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on UE configuration information associated with the UE as provided by the network.

Figure 10:
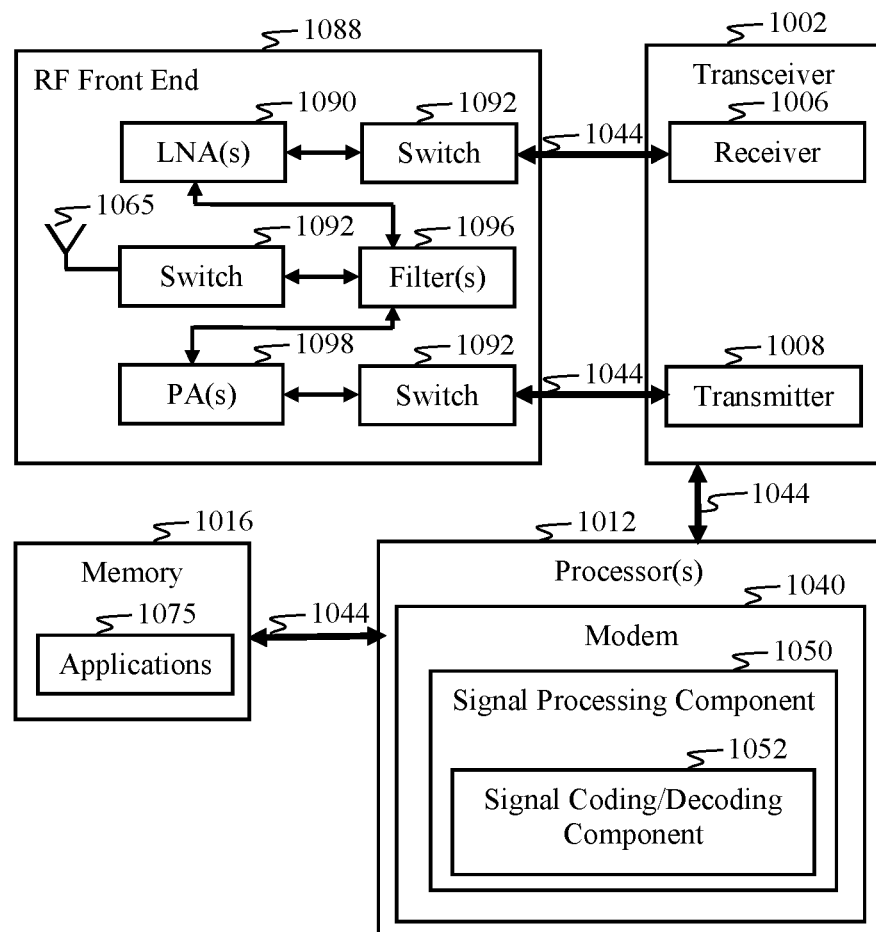
FIG. 10 is a schematic diagram of example components of a network device, such as a base station, that can be configured according to aspects of the presents disclosure.

FIG. 10 is an example implementation of a base station, which may include a variety of components, some of which have already been described above, but including components such as one or more processors 1012 and memory 1016 and transceiver 1002 in communication via one or more buses 1044, which may operate in conjunction with modem 1040, signal processing component 1050 and signal coding/decoding component 1052 to enable one or more of the functions described herein.

The transceiver 1002, receiver 1006, transmitter 1008, one or more processors 1012, memory 1016, applications 1075, buses 1044, RF front end 1088, LNAs 1090, switches 1092, filters 1096, PAs 1098, and one or more antennas 1065 may be the same as or similar to the corresponding components of the UE, as described above, but configured or otherwise programmed for base station operations as opposed to UE operations. In some implementations, at least one of the RF front end 1088, transmitter 1008, and modem 1040 may comprise or form at least a portion of means for transmitting a communication signal. In some implementations, at least one of the RF front end 1088, receiver 1068, and modem 1040 may comprise or form at least a portion of means for receiving a communication signal.

Figure 11A:
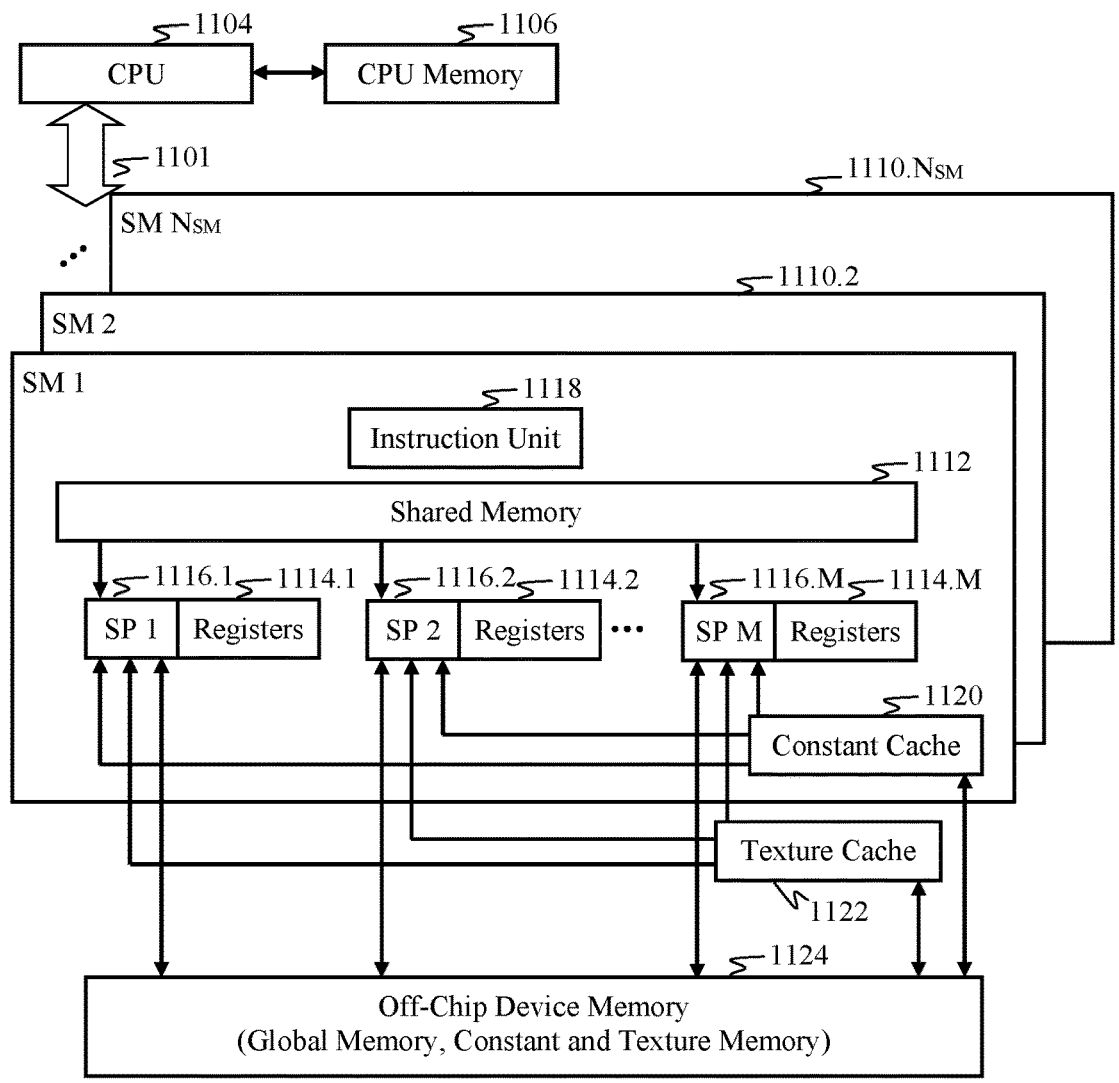
FIG. 11A is a schematic diagram of example components in a computer processor (such as a Graphics Processing Unit (GPU)) architecture that can be configured for signal-processing functions according to aspects of the present disclosure.

FIG. 11A illustrates a graphics processing unit (GPU) architecture that can be optimized for signal-processing functions disclosed herein. The hardware and/or software can optimize expanded-matrix processing operations and partial updates, which include a variety of optimization solutions specific to sparse processing. The GPU architecture can be adapted for optimizing global memory access, optimizing shared memory access, and exploiting reuse and parallelism. Optimizing sparse processing operations can include characterizing memory access cost, access pattern, type and level of memory, and exploiting data locality. Exploiting reuse can include caching each element in on-chip memories, and exploiting parallelism can include employing synchronization-free parallelism.

Aspects disclosed herein can provide for optimizing dense and/or sparse operations (including sparse matrix-matrix multiplication, sparse transforms, and other operations that involve or are based upon diagonal expansion matrices and/or expanded discrete-time matrices) on graphics processing units (GPUs) using model-driven compile- and run-time strategies. By way of illustration, FIG. 11A depicts a GPU parallel computing architecture that includes $N_{SM}$ levels of streaming multiprocessors (SMs) 1110.1-1110.N (SM 1, SM 2, . . . , SM $N_{SM}$), each comprising a shared memory component 1112, a level of M registers 1114.1-1114.M, a level of streaming processors (SPs) 1116.1-1116.M (SP 1, SP 2, . . . , SP M), an instruction unit 1118, a constant cache component 1120, and a texture cache component 1122. There are various memories available in GPUs, which can be organized in a hybrid cache and local-store hierarchy. The memories can include off-chip global memory, off-chip local memory, on-chip shared memory, off-chip constant memory with on-chip cache, off-chip texture memory with on-chip cache, and on-chip registers. An off-chip device memory component 1124 can include global memory and/or constant and texture memory. The GPU architecture can include or be communicatively coupled 1101 to a CPU 1104 and a CPU memory 1106, which may be adapted to store computer-readable instructions and data for performing the activity of the CPU 1104. The CPU 1104 may be in operative communication with components of the GPU architecture or similar components via a bus, a network, or some other communication coupling. The CPU 1104 may effect initiation and scheduling of the processes or functions performed by the GPU architecture.

The shared memory 1112 is present in each SM 610.1-610.$N_{SM}$ and can be organized into banks. Bank conflict can occur when multiple addresses belonging to the same bank are accessed at the same time. Each SM 1110.1-1110.N also has a set of registers 1114.1-1114.M. The constant and texture memories are read-only regions in the global memory space and they have on-chip read-only caches. Accessing constant cache 1120 is faster, but it has only a single port and hence it is beneficial when multiple processor cores load the same value from the cache. Texture cache 1124 has higher latency than constant cache 1120, but it does not suffer greatly when memory read accesses are irregular, and it is also beneficial for accessing data with two-dimensional (2D) spatial locality.

The GPU computing architecture can employ a single instruction multiple threads (SIMT) model of execution. The threads in a kernel are executed in groups called warps, where a warp is a unit of execution. The scalar SPs within an SM share a single instruction unit and the threads of a warp are executed on the SPs. All the threads of a warp execute the same instruction and each warp has its own program counter. Each thread can access memories at different levels in the hierarchy, and the threads have a private local memory space and register space. The threads in a thread block can share a shared memory space, and the GPU dynamic random access memory (DRAM) is accessible by all threads in a kernel.

For memory-bound applications, such as matrix-matrix multiplication, it is advantageous to optimize memory performance, such as reducing the memory footprint and implementing processing strategies that better tolerate memory access latency. Many optimization strategies have been developed to handle the indirect and irregular memory accesses of sparse operations, such as sparse matrix vector multiplication (SpMV), for example. SpMV-specific optimizations depend heavily on the structural properties of the sparse matrix, and the problem is often formulated as one in which these properties are known only at run-time. However, in some aspects of the disclosure, sparse matrices have a well-defined structure that is known before run-time, and this structure can remain the same for many data sets. This simplifies the problem and thereby enables better-performing solutions. For example, weight update operations disclosed herein can be modeled as SpMV with a corresponding sparse operator matrix. If the structural properties of the sparse operator matrix are known before run-time, the hardware and software acceleration strategies can be more precisely defined.

The optimal memory access pattern is also dependent on the manner in which threads are mapped for computation and also on the number of threads involved in global memory access, as involving more threads can assist in hiding the global memory access latency. Consequently, thread mapping schemes can improve memory access.

Memory optimization may be based on the CSR format, and the CSR storage format can be adapted to suit the GPU architecture.

Some aspects can exploit synchronization-free parallelism. In an SpMV computation, the parallelism available across rows enables a distribution of computations corresponding to a row or a set of rows to a thread block as opposed to allocating one thread to perform the computation corresponding to one row and a thread block to handle a set of rows. A useful access strategy for global memory is the hardware-optimized coalesced access pattern when consecutive threads of a half-warp access consecutive elements. For example, when all the words requested by the threads of a half-warp lie within the same memory segment, and if consecutive threads access consecutive words, then all the memory requests of the half-warp are coalesced into one memory transaction.

One strategy maps multiple threads per row such that consecutive threads access consecutive non-zero elements of the row in a cyclic fashion to compute partial products corresponding to the non-zero elements. The threads mapped to a row can compute the output vector element corresponding to the row from the partial products through parallel sum reduction. The partial products can be stored in shared memory, as they are accessed only by threads within a thread block.

Some techniques can exploit data locality and reuse. The input and output vectors can exhibit data reuse in SpMV computation. The reuse of output vector elements can be achieved by exploiting synchronization-free parallelism with optimized thread mapping, which ensures that partial contributions to each output vector element are computed only by a certain set of threads and the final value is written only once. The reuse pattern of input vector elements depends on the non-zero access pattern of the sparse matrix.

Exploiting data reuse of the input vector elements within a thread or among threads within a thread block can be achieved by caching the elements in on-chip memories. The on-chip memory may be, for example, texture (hardware) cache, registers, or shared memory (software) cache. Utilizing registers or shared memory to cache input vector elements can include identifying portions of a vector that are reused, which in turn, requires the identification of dense sub-blocks in the sparse matrix. For a predetermined set of sparse weight vectors, this information is already known. Preprocessing of the sparse matrix can be performed to extract dense sub-blocks, and a block storage format can be implemented that suits the GPU architecture (e.g., enables fine-grained thread-level parallelism). If the sequence length of the data symbols does not vary, then the sub-block size remains constant, which avoids the memory access penalty for reading block size and block index, as is typically required in SpMV optimizations.

Techniques described herein can include tuning configuration parameters, such as varying the number of threads per thread block used for execution and/or varying number of threads handling a row. To achieve high parallelism and to meet latency constraint, the SpMV can include multiple buffers. In one aspect, SpMV may include two sparse matrix buffers, two pointer buffers, and two output buffers. For example, two sparse matrix buffers are configured in alternate buffer mode for buffering sparse matrix coefficients, two pointer buffers are configured in alternate buffer mode for buffering pointers representing non-zero coefficient start positions in each column of the sparse matrix, while two output buffers are configured in alternate buffer mode to output the calculation result from one output buffer while the other output buffer is used to buffer the calculation result.

Figure 11B:
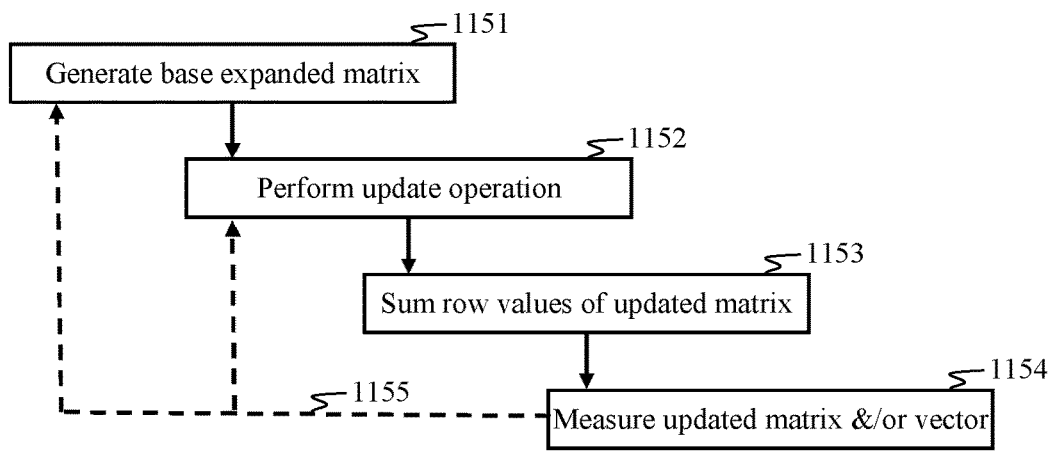
FIG. 11B is a flow diagram that depicts some aspects of the disclosure.

FIG. 11B is a flow diagram that is illustrative of a method, functional components of an apparatus, and code segments of a computer program in accordance with aspects of the disclosure. Data symbols are processed for generating 1151 a base expanded matrix having a plurality of rows and a plurality of columns, wherein a sum of values in each row can produce a base signal vector, such as a discrete-time signal. Values in at least one column of the base expanded matrix are updated 1152 to produce an updated expanded matrix. The values in each row of the updated expanded matrix are summed 1153 to produce an updated signal vector.

At least one feature of the updated expanded matrix and/or the updated signal vector may be measured 1154. If only the updated expanded matrix is measured 1154, then the diagram may flow directly from update 1152 to measure 1154. If an updated expanded matrix meets at least one measurement criterion in 1154, the rows of the expanded matrix may be summed 1153. In an aspect, the measurement in 1154 is used, at least in part, to control the update operation 1152. In an aspect, the measurement in 1154 is used, at least in part, to assign at least one updated expanded matrix as a base expanded matrix in 1151, which may be subsequently updated 1152, such as in an iterative process.

Some aspects can be implemented in artificial neural networks (ANNs), such as ANNs with dynamically generated filters. In an aspect, a filter-generating network produces filters conditioned on an input. The input can comprise the input data d to 1151 and the filters can comprise the weight values of $w^{(u)}$ employed in 1152. In an aspect, a dynamic filtering layer applies the generated filters to another input. The input can comprise the input data d to 1151 and the filters can be applied in 1151 and/or 1152. The filter-generating network can be implemented with any differentiable architecture, such as a multilayer perceptron or a convolutional network. Element 1154 can function as a decision network, such as for selecting sample-specific features, learning new filters, and/or operating as a prediction network (e.g., a classifier).

In one aspect, FIG. 11B can generate filters given a sample-specific feature vector d. The filters can comprise base and/or update weight values $w^{(u)}$, which may be stored in a filter repository, and which are referred to as base filters. The process can be configured to learn a matrix that maps the feature vector d to a set of coefficients which will be used to linearly combine the base filters in the repository to generate new filters. This can constitute an additive update, for example. The set of coefficients can be implemented as an update weight matrix (in combination with the base filters), such as in the techniques disclosed herein. In another aspect, new filters may be generated directly from the feature vector d. In an aspect, the system learns sample-specific features to be used for filter generation.

In some aspects, filter sets can correspond to known physical properties of the input signal, such as modulation, coding, spectral signature, bandwidth, CSI, SNR, etc., and such properties can be used to train the network to represent these properties as a feature vector. However, there can be other properties of the input, and the system can learn the mapping in an unsupervised manner by employing the update techniques disclosed herein. In an aspect, the system learns sample-specific features for filter generation, extracts the features from the input data, maps a feature vector to a set of filters, and then employs a prediction network that takes in the same input data and the generated filters to make a prediction for high level tasks, such as detection, recognition, classification, etc.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A method of wireless communication, comprising:
generating a base expanded matrix having a plurality of rows and a plurality of columns, wherein a sum of values in each row produces a base signal vector;
updating values in at least one column of the base expanded matrix to produce an updated expanded matrix;
summing values in each row of the updated expanded matrix to produce an updated signal vector; and
transmitting the updated signal vector over a wireless channel.

2. The method of claim 1, wherein the updating comprises an operation wherein a data matrix and a weight matrix are configured to commute under multiplication, thereby removing the data matrix and an inverse of the data matrix from the operation.

3. The method of claim 2, further comprising removing the inverse of a base weight matrix in the operation by setting an initial weight matrix to an Identity matrix or by setting the data matrix equal to a product of a previous weight matrix with a previous data matrix or by setting the base expanded matrix equal to a previous updated expanded matrix.

4. The method of claim 1, further comprising selecting the updated expanded matrix for further updating or for transmission over the wireless channel based on at least one of peak-to-average-power ratio (PAPR) and multiple-input multiple-output (MIMO) performance of at least the updated expanded matrix.

5. The method of claim 1, wherein the updating values in at least one column of the base expanded matrix comprises at least one of multiplying the base expanded matrix with a weight matrix, changing a sign of a selected value in the base expanded matrix, deleting selected values in the base expanded matrix, phase-shifting selected values in the base expanded matrix, performing bit operations on selected values of the base expanded matrix, performing an additive update to the base expanded matrix, and performing an additive update to the base signal vector.

6. The method of claim 1, wherein the updating values in at least one column of the base expanded matrix changes at least one signal parameter in the base signal vector, the at least one signal parameter comprising a data symbol value, a resource unit mapping, a layer mapping, an antenna selection, a spreading code, a selective mapping weight, a dummy symbol value, a precoding weight, a pulse shape, a mixing matrix, sparsity pattern, or order of data symbols in a data sequence.

7. The method of claim 1, wherein the updating comprises an application of a machine learning algorithm to at least one of the base expanded matrix, the base signal vector, the updated expanded matrix, and the updated signal vector; and wherein the machine learning algorithm comprises an association-rule machine learning algorithm, a clustering algorithm, a k-means algorithm, a collaborative filtering algorithm, an artificial intelligence algorithm, an artificial neural network algorithm, a filter-generating network, a dynamic filtering layer, or a prediction network.

8. The method of claim 1, wherein generating the base expanded matrix comprises performing at least one of a matrix multiplication and an invertible transform operation on a matrix expansion of data symbols.

9. A network device, comprising:
a non-transitory computer-readable memory; and
at least one processor in communication with the non-transitory computer-readable memory and configured for:
generating a base expanded matrix having a plurality of rows and a plurality of columns, wherein a sum of values in each row produces a base signal vector;
updating values in at least one column of the base expanded matrix to produce an updated expanded matrix;
summing values in each row of the updated expanded matrix to produce an updated signal vector; and
transmitting the updated signal vector over a wireless channel.

10. The network device of claim 9, wherein the updating comprises an operation wherein a data matrix and a weight matrix are configured to commute under multiplication, thereby removing the data matrix and an inverse of the data matrix from the operation.

11. The network device of claim 10, further comprising removing the inverse of a base weight matrix in the operation by setting an initial weight matrix to an Identity matrix or by setting the data matrix equal to a product of a previous weight matrix with a previous data matrix or by setting the base expanded matrix equal to a previous updated expanded matrix.

12. The network device of claim 9, wherein the processor is further configured for selecting the updated expanded matrix for further updating or for transmission over the wireless channel based on at least one of peak-to-average-power ratio (PAPR) and multiple-input multiple-output (MIMO) performance of at least the updated expanded matrix.

13. The network device of claim 9, wherein updating values in at least one column of the base expanded matrix comprises at least one of multiplying the base expanded matrix with a weight matrix, changing a sign of a selected value in the base expanded matrix, deleting selected values in the base expanded matrix, phase-shifting selected values in the base expanded matrix, performing bit operations on selected values of the base expanded matrix, performing an additive update to the base expanded matrix, and performing an additive update to the base signal vector.

14. The network device of claim 9, wherein updating values in at least one column of the base expanded matrix changes at least one signal parameter in the base signal vector, the at least one signal parameter comprising a data symbol value, a resource unit mapping, a layer mapping, an antenna selection, a spreading code, a selective mapping weight, a dummy symbol value, a precoding weight, a pulse shape, a mixing matrix, sparsity pattern, or order of data symbols in a data sequence.

15. The network device of claim 9, wherein the updating comprises an application of a machine learning algorithm to at least one of the base expanded matrix, the base signal vector, the updated expanded matrix, and the updated signal vector; and wherein the machine learning algorithm comprises an association-rule machine learning algorithm, a clustering algorithm, a k-means algorithm, a collaborative filtering algorithm, an artificial intelligence algorithm, an artificial neural network algorithm, a filter-generating network, a dynamic filtering layer, or a prediction network.

16. The network device of claim 9, wherein generating the base expanded matrix comprises performing at least one of a matrix multiplication and an invertible transform operation on a matrix expansion of data symbols.

17. A computer program product, comprising a non-transitory computer-readable memory having computer-readable program code stored thereon, the computer-readable program code containing instructions executable by one or more processors to implement a method comprising:
generating a base expanded matrix having a plurality of rows and a plurality of columns, wherein a sum of values in each row produces a base signal vector;
updating values in at least one column of the base expanded matrix to produce an updated expanded matrix;
summing values in each row of the updated expanded matrix to produce an updated signal vector; and
transmitting the updated signal vector over a wireless channel.

18. The computer program product of claim 17, wherein the updating comprises an operation wherein a data matrix and a weight matrix are configured to commute under multiplication, thereby removing the data matrix and an inverse of the data matrix from the operation.

19. The computer program product of claim 18, further comprising removing the inverse of a base weight matrix in the operation by setting an initial weight matrix to an Identity matrix or by setting the data matrix equal to a product of a previous weight matrix with a previous data matrix or by setting the base expanded matrix equal to a previous updated expanded matrix.

20. The computer program product of claim 18, wherein the method further comprises selecting the updated expanded matrix for further updating or for transmission over the wireless channel based on at least one of peak-to-average-power ratio (PAPR) and multiple-input multiple-output (MIMO) performance of at least the updated expanded matrix.

21. The computer program product of claim 18, wherein updating values in at least one column of the base expanded matrix comprises at least one of multiplying the base expanded matrix with a weight matrix, changing a sign of a selected value in the base expanded matrix, deleting selected values in the base expanded matrix, phase-shifting selected values in the base expanded matrix, performing bit operations on selected values of the base expanded matrix, performing an additive update to the base expanded matrix, and performing an additive update to the base signal vector.

22. The computer program product of claim 18, wherein updating values in at least one column of the base expanded matrix changes at least one signal parameter in the base signal vector, the at least one signal parameter comprising a data symbol value, a resource unit mapping, a layer mapping, an antenna selection, a spreading code, a selective mapping weight, a dummy symbol value, a precoding weight, a pulse shape, a mixing matrix, sparsity pattern, or order of data symbols in a data sequence.

23. The computer program product of claim 18, wherein the updating comprises an application of a machine learning algorithm to at least one of the base expanded matrix, the base signal vector, the updated expanded matrix, and the updated signal vector; and wherein the machine learning algorithm comprises an association-rule machine learning algorithm, a clustering algorithm, a k-means algorithm, a collaborative filtering algorithm, an artificial intelligence algorithm, an artificial neural network algorithm, a filter-generating network, a dynamic filtering layer, or a prediction network.

24. The computer program product of claim 18, wherein generating the base expanded matrix comprises performing at least one of a matrix multiplication and an invertible transform operation on a matrix expansion of data symbols.

\* \* \* \* \*